United States Patent
Buttolph

(10) Patent No.: US 11,754,379 B2
(45) Date of Patent: Sep. 12, 2023

(54) SPACE SAVING WING STOWAGE

(71) Applicant: Simmonds Precision Products, Inc., Vergennes, VT (US)

(72) Inventor: Martin Edwy Buttolph, Middlebury, VT (US)

(73) Assignee: Simmonds Precision Products, Inc., Middlebury, VT (US)

( * ) Notice: Subject to any disclaimer, the term of this patent is extended or adjusted under 35 U.S.C. 154(b) by 402 days.

(21) Appl. No.: 16/982,801

(22) PCT Filed: Mar. 21, 2019

(86) PCT No.: PCT/US2019/023442
§ 371 (c)(1),
(2) Date: Sep. 21, 2020

(87) PCT Pub. No.: WO2019/183402
PCT Pub. Date: Sep. 26, 2019

(65) Prior Publication Data
US 2021/0140748 A1 May 13, 2021

Related U.S. Application Data

(60) Provisional application No. 62/647,310, filed on Mar. 23, 2018.

(51) Int. Cl.
*F42B 10/14* (2006.01)
(52) U.S. Cl.
CPC .................... *F42B 10/14* (2013.01)
(58) Field of Classification Search
CPC .......................................................... F42B 10/14
See application file for complete search history.

(56) References Cited

U.S. PATENT DOCUMENTS

| | | | | |
|---|---|---|---|---|
| 3,127,838 A | * | 4/1964 | Moratti | F42B 10/14 244/3.28 |
| 3,627,233 A | * | 12/1971 | Jacobson | F42B 10/14 244/3.27 |
| 4,203,569 A | * | 5/1980 | Marks | F42B 10/30 244/3.28 |
| 4,533,094 A | | 8/1985 | Geis et al. | |

(Continued)

FOREIGN PATENT DOCUMENTS

| CN | 103837045 A | 6/2014 |
|---|---|---|
| EP | 2234876 B1 | 5/2016 |

(Continued)

OTHER PUBLICATIONS

Great Britain Examination Report for GB Application No. GB2016866.2, dated Feb. 17, 2022, pp. 3.

(Continued)

*Primary Examiner* — Philip J Bonzell
*Assistant Examiner* — Michael B. Kreiner
(74) *Attorney, Agent, or Firm* — Kinney & Lange, P.A.

(57) ABSTRACT

A guided projectile includes a body and a deployable wing in which the deployable wing is coupled to and enclosed by the body. A linear distance from the leading edge to the trailing edge of the wing defines a chord line that, in the stowed position, forms an angle with a plane containing the chord line and extending parallel to a longitudinal dimension of the wing in a deployed position.

19 Claims, 17 Drawing Sheets

(56) References Cited

U.S. PATENT DOCUMENTS

| | | | |
|---|---|---|---|
| 4,708,304 A | | 11/1987 | Wedertz et al. |
| 4,858,851 A | | 8/1989 | Mancini et al. |
| 5,141,175 A | | 8/1992 | Harris |
| 5,480,111 A | * | 1/1996 | Smith ............... F42B 10/14 |
| | | | 244/3.29 |
| 5,615,846 A | | 4/1997 | Shmoldas et al. |
| 5,780,766 A | | 7/1998 | Schroppel |
| 6,695,252 B1 | * | 2/2004 | Dryer ............... F42B 10/14 |
| | | | 244/3.28 |
| 6,761,331 B2 | * | 7/2004 | Eisentraut ......... F42B 10/14 |
| | | | 244/3.28 |
| 7,083,141 B2 | * | 8/2006 | Nitenson .......... F42B 15/00 |
| | | | 244/3.28 |
| 8,674,278 B2 | * | 3/2014 | Buckland ......... F42B 10/14 |
| | | | 244/3.21 |
| 9,086,258 B1 | * | 7/2015 | Vasudevan ....... F42B 30/10 |
| 11,578,956 B1 | * | 2/2023 | Cheung ............ F42B 10/14 |
| 2014/0203134 A1 | | 7/2014 | Plumer et al. |
| 2017/0299355 A1 | | 10/2017 | Trouillot et al. |

FOREIGN PATENT DOCUMENTS

| | | |
|---|---|---|
| WO | WO2008010226 A1 | 1/2008 |
| WO | WO2011105949 A1 | 9/2011 |
| WO | WO2017035126 A1 | 3/2017 |

OTHER PUBLICATIONS

International Search Report and Written Opinion for PCT Application No. PCT/US2019/023442, dated May 23, 2019, pp. 27.
International Preliminary Report on Patentability for PCT Application No. PCT/US2019/023442, dated Oct. 8, 2020, pp. 7.

* cited by examiner

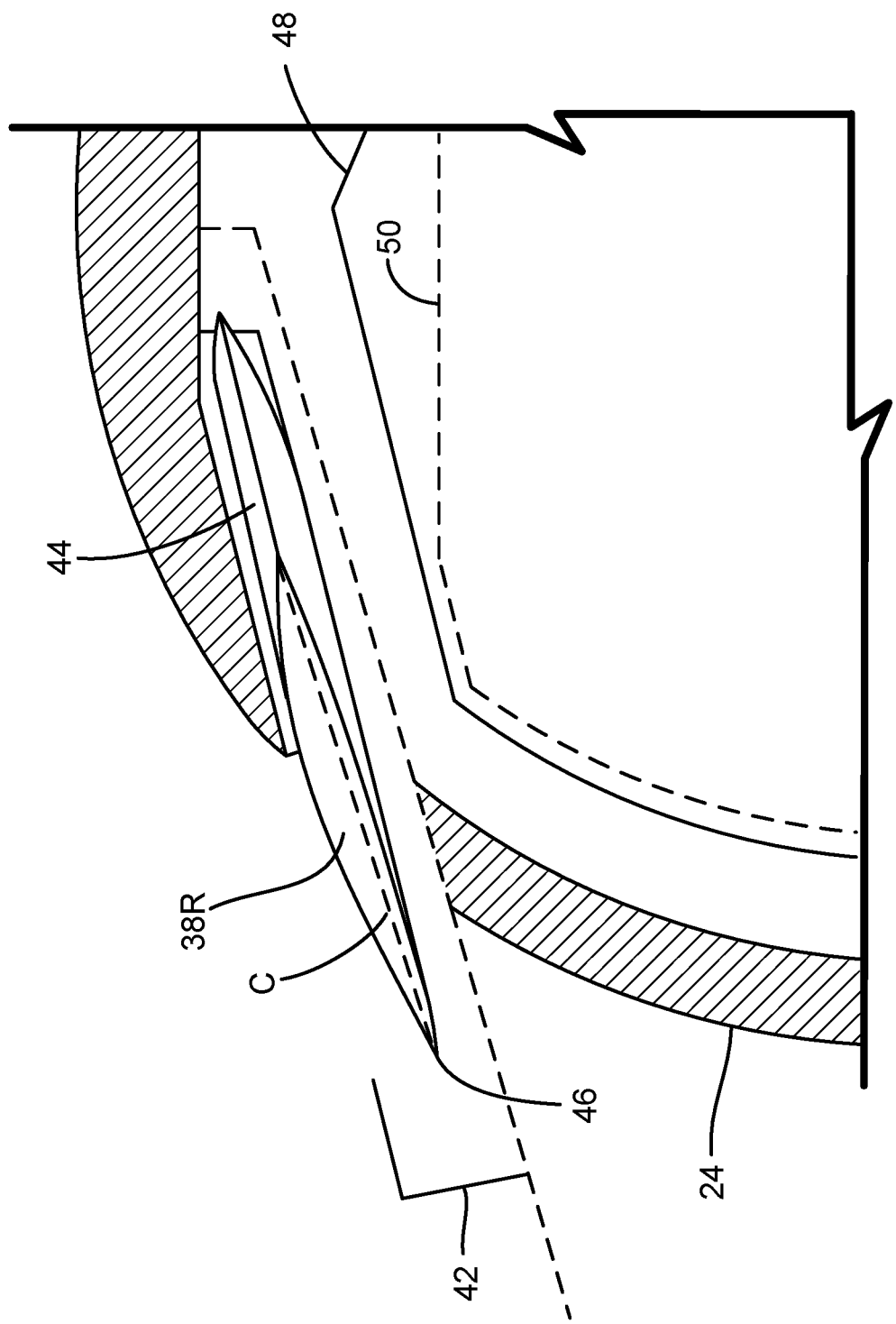

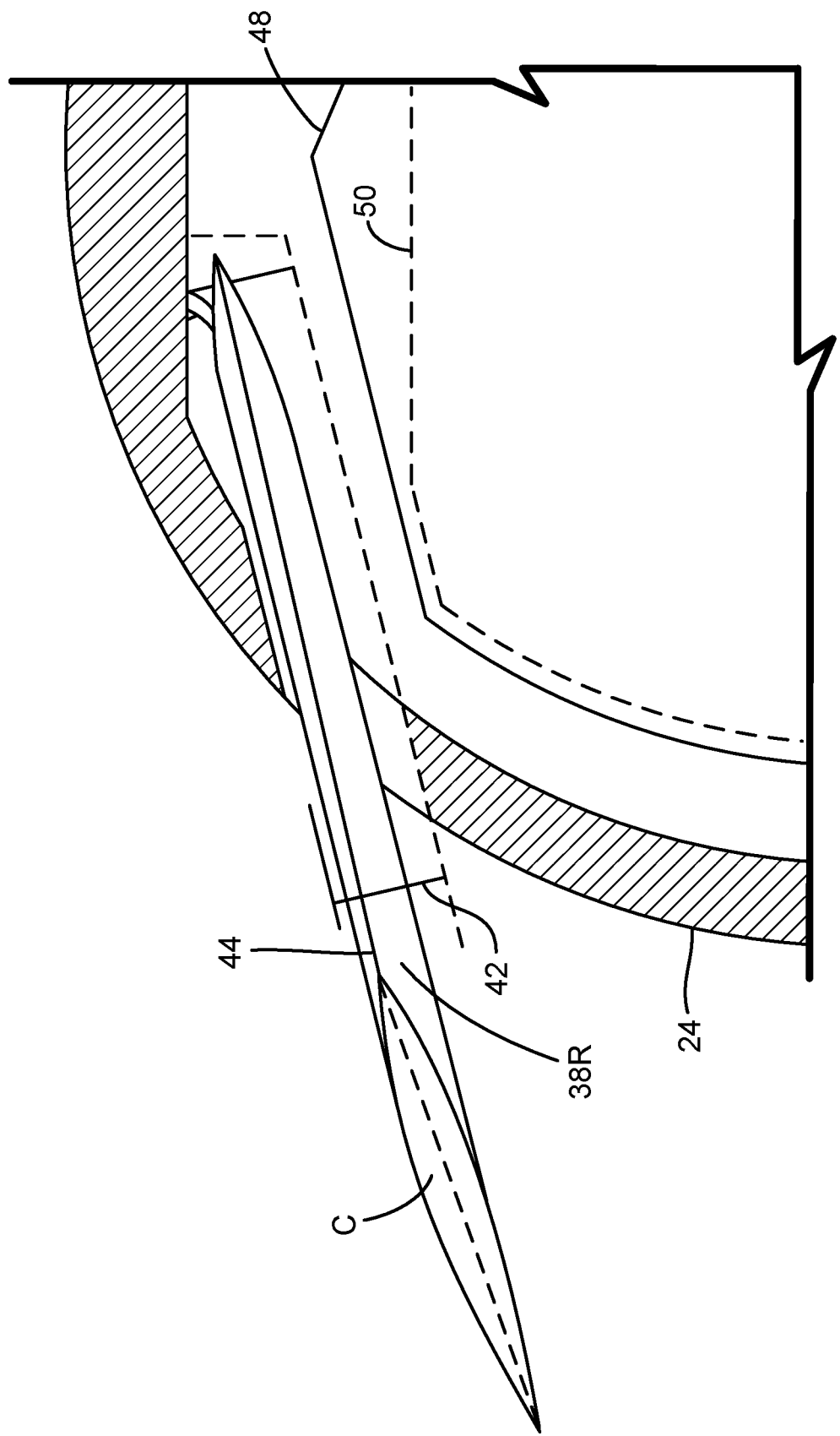

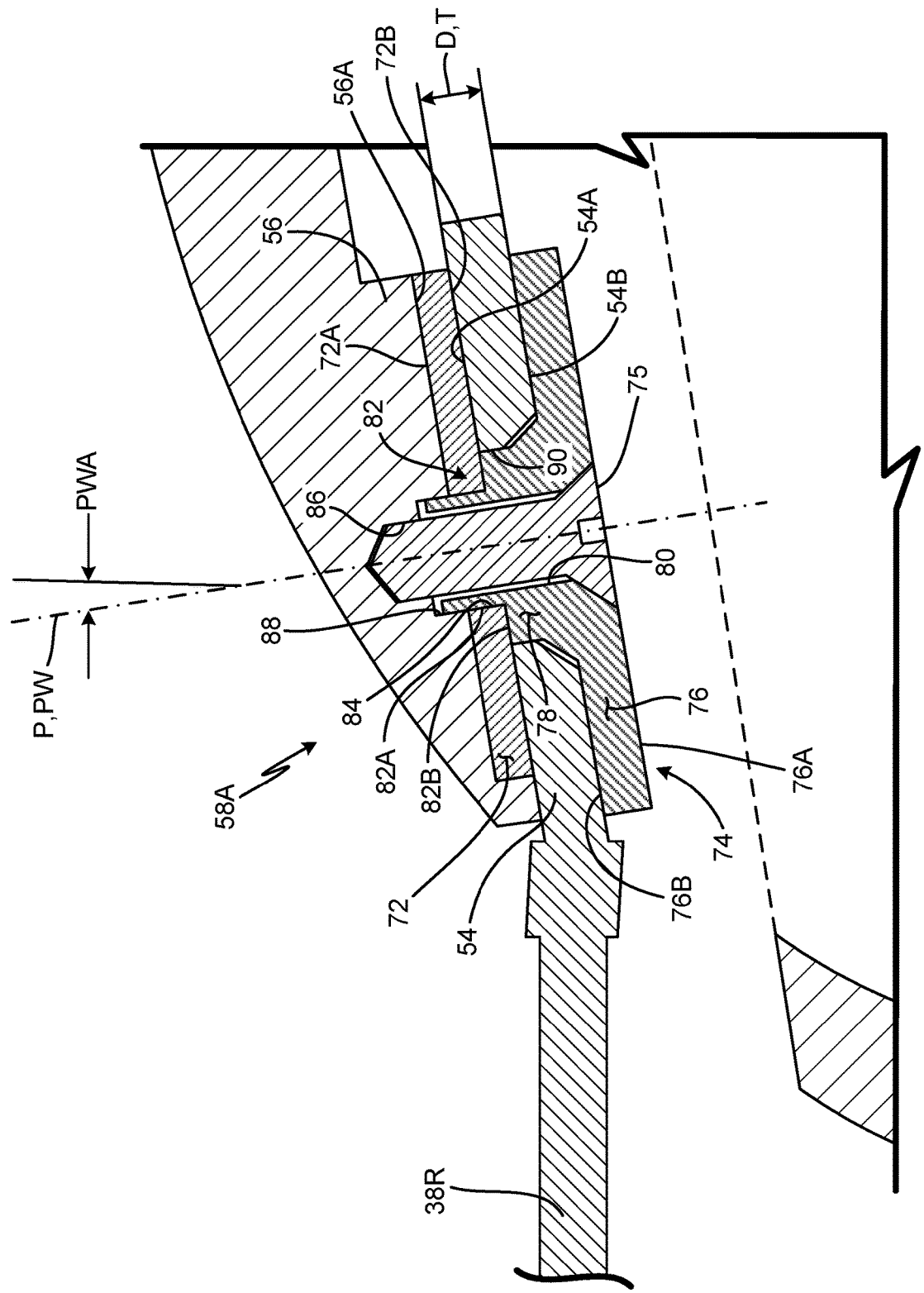

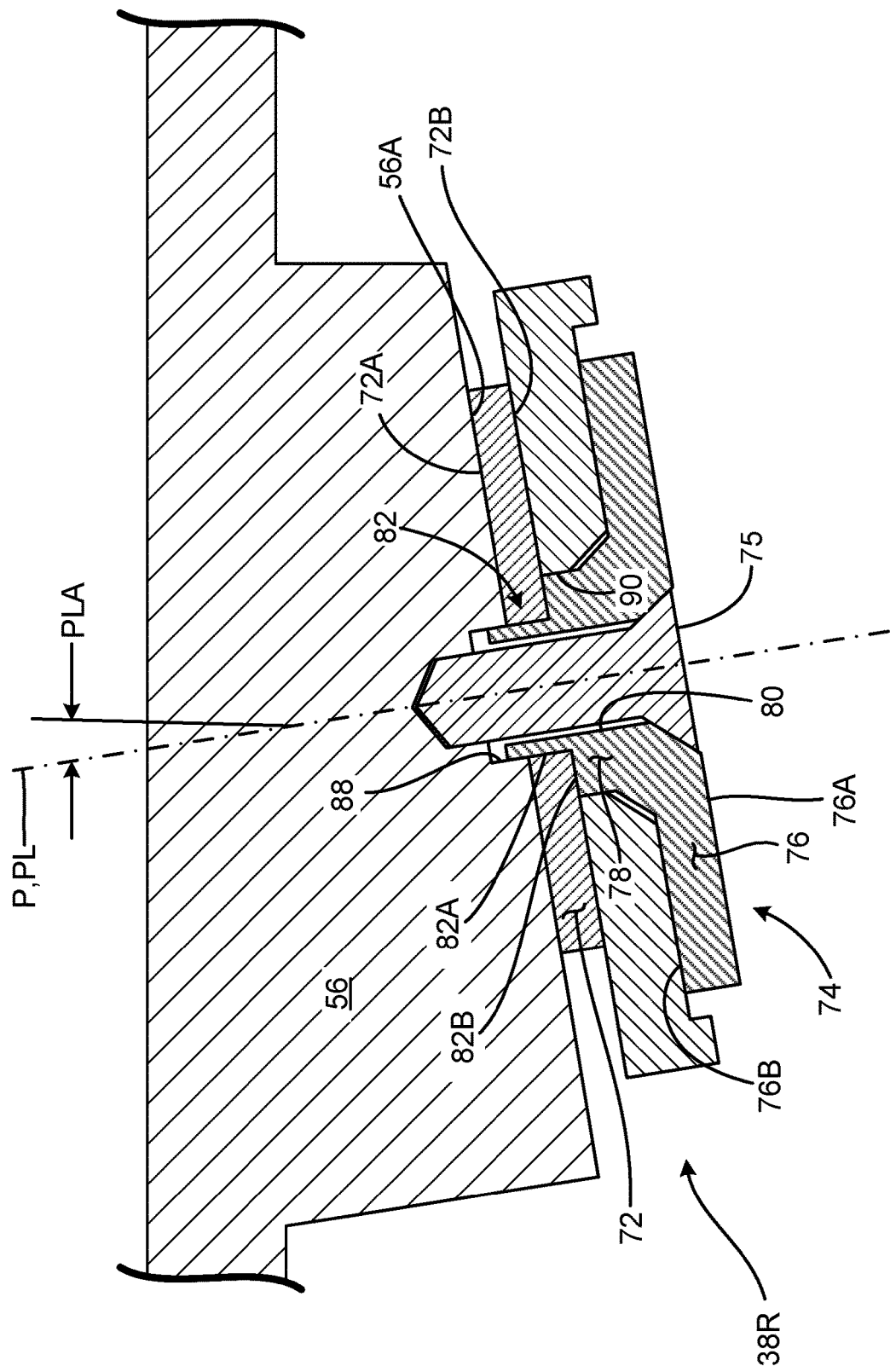

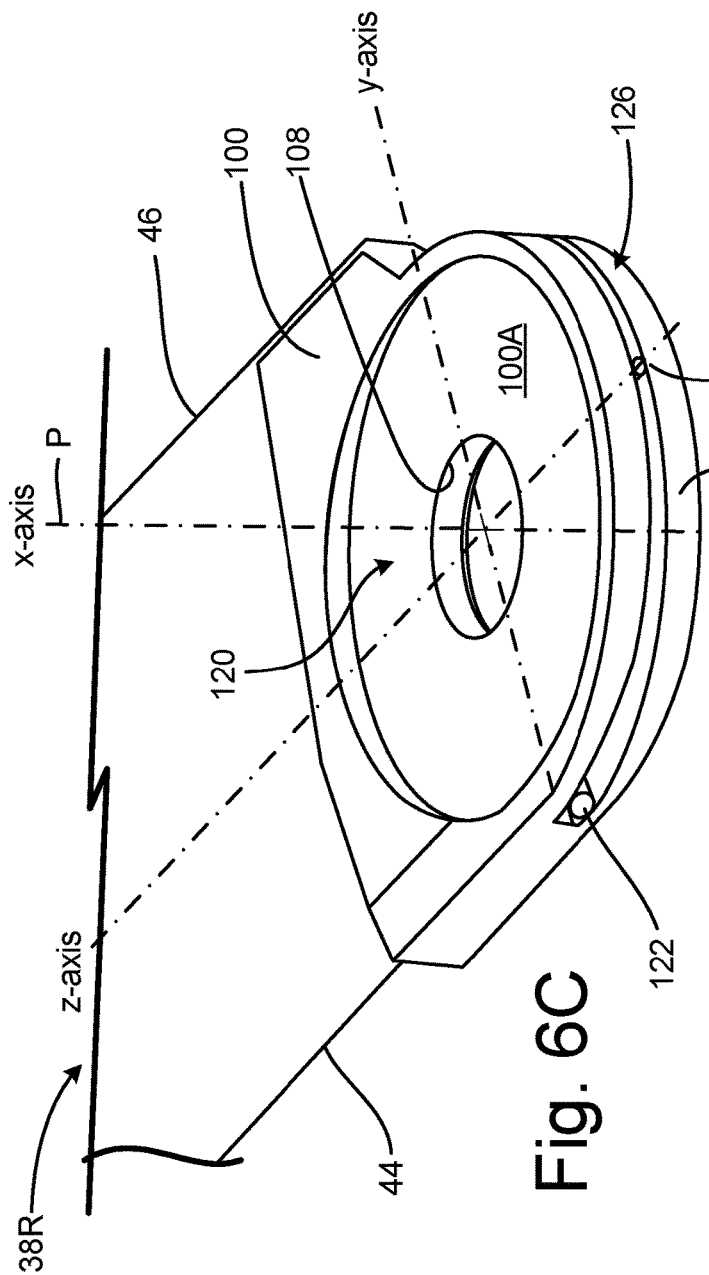
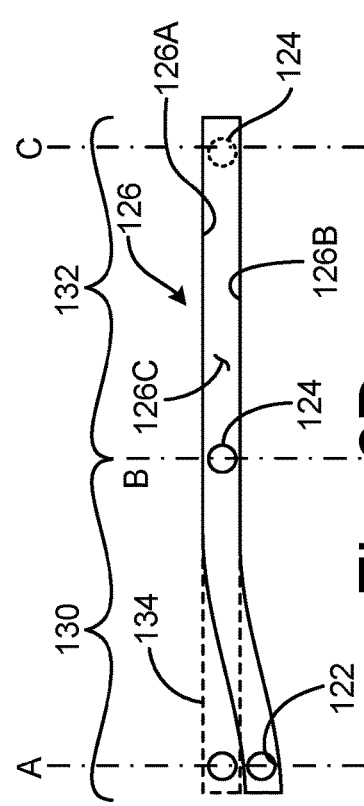
Fig. 6C
Fig. 6D

SPACE SAVING WING STOWAGE

BACKGROUND

The present invention relates generally to deployable airfoils and, more specifically, to airfoils deployed from a guided munition mid-trajectory.

Conventional mortar systems include an explosive projectile fired from a smooth-bored tube along a ballistic trajectory. The range of the projectile is primarily determined by the firing angle and the magnitude of the propellant used to propel the projectile from the tube and secondarily determined by wind conditions, firing and target elevations, among other environmental conditions. Increasing the maximum effective range of the mortar system involves increasing the propellant to impart a greater initial velocity to the projectile exiting the tube. However, because of a need for mortar systems to be portable by one or more persons, increasing the propellant undesirably increases the weight of the mortar system. Increasing the propellant also imparts larger forces on the projectile that must be accounted for with stronger materials, which generally increase cost, or increased material sections, further increasing the weight of the mortar system. Furthermore, conventional mortar systems fire unguided projectiles with discrete propellant charges that combine with the initial firing angle to target a point of impact. Accordingly, delivering a projectile to a desired point of impact often involves firing multiple projectiles in which operators apply minor corrections to the initial firing angle between successively-fired projectiles.

Recent attempts to improve the range and accuracy of conventional mortar systems have led to the introduction of guided projectiles, which are equipped with at least one deployable flow control aid. For instance, some projectiles are equipped with two or more canards located forward of the projectile center of gravity and two or more tail fins or stabilizers at an aft end of the projectile. Various configurations of optical sensors, gps antennas, cameras, and/or accelerometers can be used to control the orientation of the canards to guide the projectile to the point of impact while the tail fins stabilize the projectile along the trajectory. Other guided projectiles deploy wings that extend radially from the projectile near the projectile center of gravity to extend the range of the projectile. For launching, these flow control aids can be stowed against an exterior surface of the projectile or, in some instances, are stowed within a casing of the projectile.

For instance, some guided projectiles stow each wing within the projectile body by rotating each wing about a pivot. However, because each wing rotates along a plane parallel to a meridional plane of the guided projectile (e.g. a horizontal plane), the wings extend into a volume used for the payload. Guided projectiles utilizing this type of stowed wing must reduce the payload volume to provide clearance for the wings in the stowed position or increase the overall size of the projectile to compensate of the lost payload volume. Reducing the payload volume decreases the explosive power of the guided projectile while the increased weight of the larger projectile reduces projectile range and portability. However, because munition manufacturers continue to increase the range and power of guided projectiles, a need exists for connecting flow guides to a projectile such that the stowed flow guide does not inordinately interfere with the payload volume or, in other words, minimizes interference with the payload volume.

SUMMARY

In one embodiment, a guided projectile includes a body and a deployable wing coupled to and enclosed by the body. The deployable wing includes a chord line defined by a linear distance from a leading edge to a trailing edge of the wing. In a stowed position, the chord line forms an angle with a plane containing the chord line and extending parallel to a longitudinal dimension of the wing in the deployed position. In a further embodiment, a pivot couples the deployable wing to the body in which a rotational axis of the pivot is inclined laterally outward from the body and longitudinally forward towards a nose of the projectile.

In another embodiment, a projectile includes a nose, a body, and a tail boom opposite the nose along a longitudinal axis of the body. The projectile further includes a plurality of stabilizers extending from a mount on the tail boom and a deployable wing coupled to the body at a pivot. Rotation about the pivot moves the deployable wing from a stowed position to a deployed position. In the stowed or deployed positions, the linear distance from a leading edge to a trailing edge of the deployable wing defines a chord line. In the deployed position, a reference plane is defined by the chord line and a longitudinal dimension of the wing. In the stowed position, the chord line of the deployable wing forms an acute angle with the reference plane. In a further embodiment, the projectile further includes a spherical bearing and a plurality of followers affixed to the body of the projectile, each follower received by a groove formed in the lug.

BRIEF DESCRIPTION OF THE DRAWINGS

FIG. 3B is a cross-sectional view of the guided projectile taken at plane A-A showing the starboard wing with a deployment angle of approximately 4 degrees.

FIG. 3C is a cross-sectional view of the guided projectile taken at plane A-A showing the starboard wing with a deployment angle of approximately 15 degrees.

FIG. 5A is a cross-sectional view of the guided projectile taken through the starboard wing along a plane normal to a longitudinal axis of the projectile that shows another exemplary embodiment of a planar contact pivot.

FIG. 5B is a cross-sectional view of the guided projectile taken through the starboard wing along a plane parallel to the longitudinal axis of the projectile that shows the planar contact pivot of FIG. 5A.

FIG. 6C is an isometric view of the starboard wing showing features of the cam-guided pivot of FIGS. 6A and 6B.

FIG. 6D is a developed view of the cam groove included in the cam-guided pivot of FIGS. 6A, 6B, and 6C.

DETAILED DESCRIPTION

Figure 1:
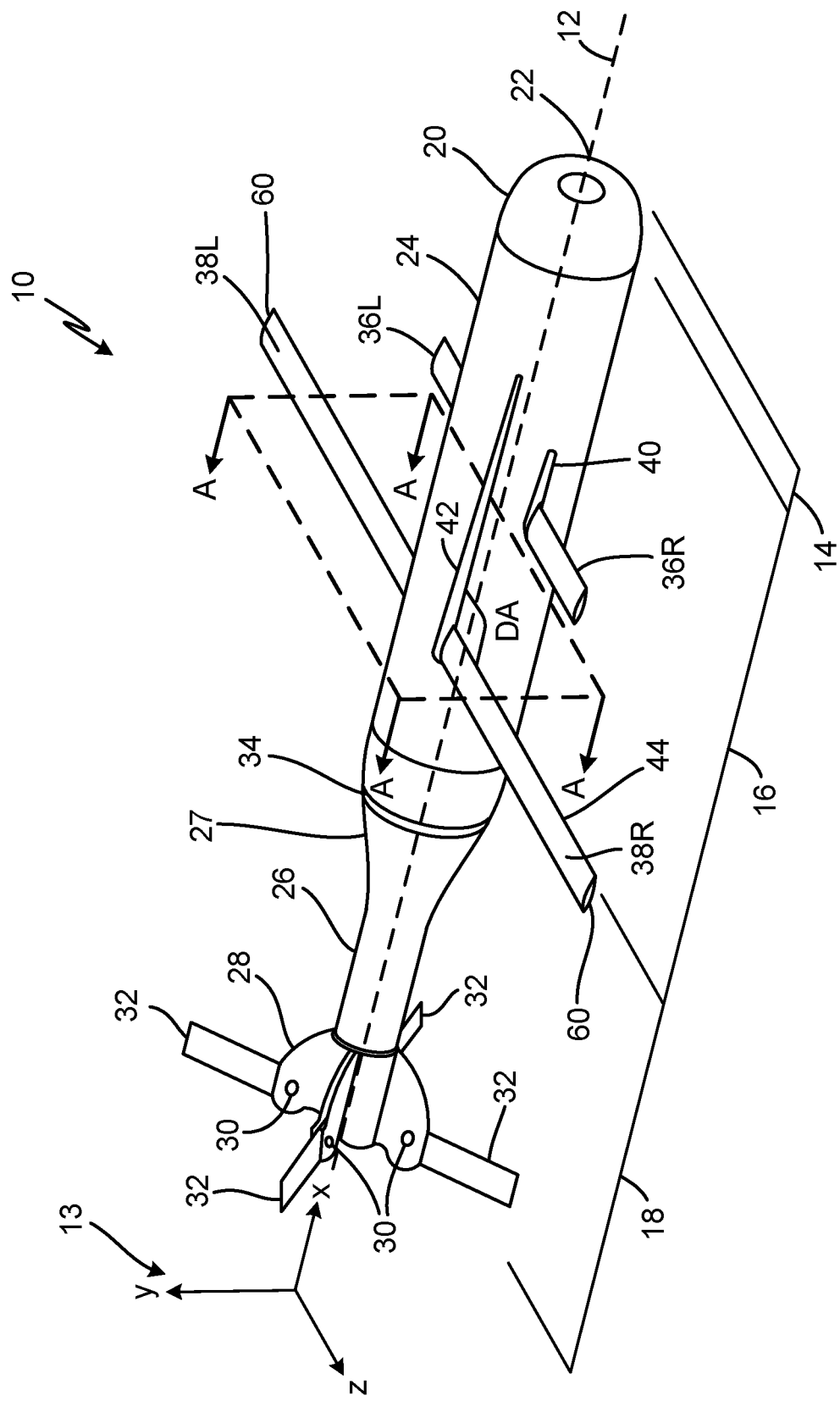
FIG. 1 is an isometric view of a guided projectile with range-extending deployable wings.

FIG. 1 is an isometric view of guided projectile 10 extending along longitudinal axis 12, which is located along a geometric center of projectile 10. For the purposes of explanation, the following disclosure refers to projectile coordinate system 13 having mutually orthogonal axes. The X-axis of projectile coordinate system 13 is collinear with longitudinal axis 12. A meridional plane of projectile 10 is any plane containing longitudinal axis 12 and, therefore, the X-axis of projectile coordinate system 13. The X-Y plane defines a vertical meridional plane of projectile 10, and the X-Z plane defines a horizontal meridional plane. The terms "vertical" and "horizontal" are used to refer to a particular meridional plane of projectile 10 and are not intended to fix each plane in space globally, but instead, the vertical meridional plane is nominally oriented along a direction of lift imposed on the projectile while the horizontal meridional plane refers to a meridional plane perpendicular to the vertical meridional plane. Thus, the vertical and horizontal meridional planes, or any other meridional plane, are meant to be local to projectile 10, moving and rotating in fixed relation with respect to projectile 10.

Furthermore, "longitudinal", "longitudinally", and the like refer to a lengthwise dimension of a component. As used in reference to projectile 10, the longitudinal dimension is aligned with the X-axis of projectile coordinate system 13. The "lateral" dimension of a component extends away from or towards longitudinal axis 12 and includes movements or dimensions with a Z-component within projectile coordinate system 13. When used in reference to projectile 10, "radial", "radially", and the like refer to movements or dimensions extending radially from longitudinal axis 12 and, thus, have a Y-component, a Z-component, or both a Y-component and a Z-component within projectile coordinate system 13.

Projectile 10 includes forward section 14, body section 16, and aft section 18 centrally disposed along longitudinal axis 12. Generally, forward section 14 forms a leading surface of projectile 10 and contains components used to acquire targets and control projectile 10 to a point of impact. Body section 16 contains the projectile payload and, as will be discussed further below, may contain deployable flow guides. Aft section 18 stabilizes projectile 10 as it travels along a trajectory and may also contain a propellant charge used to propel projectile 10 from a launching platform. Projectile 10 has a center of gravity that is generally located at or proximate to longitudinal axis 12.

Forward section 14 includes nose 20, which may have a rounded, conical, or other contoured shape that transitions from leading edge point 22 to a cross sectional shape of body 24. Body 24 is shown as cylindrical in FIG. 1, although ovular, oblong, or other cross-sectional shapes are possible for body 24. Within nose 20, a fuse, a trigger, a timer, a camera, a global positioning antenna, a laser, a controller, and other sensors and devices can be installed to provide data to projectile 10 in order to pilot projectile 10 to a desired point of impact and detonate a payload contained within body section 16 using known methods.

Aft section 18 includes a cylindrical tail boom 26 and aft body 27 that tapers from the cross-section of body 24 and extends to tail fin mount 28. Located at a downstream-most portion of aft section 18, pivots 30 couple retractable tail fins or stabilizers 32 to tail fin mount 28, allowing the longitudinal direction of each tail fin 32 to be parallel with longitudinal axis 12 in a retracted position and extending radially from longitudinal axis 12 in a deployed position. Aft section 18 may further include an obturator or gas seal (not shown) seated within groove 34, which limits or prevents gases resulting from the propellant charge from bypassing projectile 10 when fired from a launching tube (not shown).

Disposed intermediate of forward section 14 and aft section 18, body section 16 may include one or more deployable flow guides such as starboard canard 36R and port canard 36L (collectively canards 36) as well as starboard wing 38R and port wing 38L (collectively wings 38). In some embodiments, flow guides such as canards 36 and wings 38 may be deployed from within body 24 and through slots 40 and 42, respectively.

Typically, canards 36 are disposed forward of the center of gravity of projectile 10 and aft of forward section 14. Extending from a meridional plane of projectile 10, canards 36 are capable of pivoting about respective longitudinal axes of each canard 36 to modify a trajectory of projectile 10.

In the deployed position, wings 38 extend laterally outward from a proximal end coupled to body 24 to a distal end or cantilevered wing tip. The proximal end of each wing 38 can be aligned with or in close proximity to the center of gravity of the projectile. In this sense, wings 38 are in close proximity of the projectile center of gravity when the position of wings 38 relative to the center of gravity, canards 36, and other flow guides, if included, prevents unintended rolling, pitching, or yawing of projectile 10 along its trajectory.

Like canards 36, wings 38 can extend radially from body 24 along a meridional plane of projectile 10. Alternatively, wings 38 can extend laterally from body 24 along a plane that is offset from the horizontal meridional plane of projectile 10 in the deployed position. For instance, wings 38 can be high-mounted or low-mounted. In a high-mounted configuration, wings 38 are offset from the horizontal meridional plane such that the projectile center of gravity is below deployed wings 38. Wings 38 with a low-mounted configuration are offset from the horizontal meridional plane such that the projectile center of gravity is above deployed wings 38.

As shown in FIG. 1, wings 38 are high-mounted. Accordingly, wings 38 are offset from the horizontal meridional plane such that the center of gravity of projectile 10 is radially inward from wings 38 or towards longitudinal axis 12. Furthermore, canards 36, wings 38, or both can be swept forward toward nose section 14 or swept backward toward tail section 18 to achieve the desired aerodynamic performance.

Wings 38 are aerodynamically shaped, forming an airfoil-shaped cross-section normal to the longitudinal dimension of each wing 38. An airfoil-shaped wing includes curved upper and lower surfaces that extend from a leading edge to a trailing edge. The contours of the upper and lower surfaces provide lift in the direction of the upper surface as is known in the art. Additionally, wings 38 can have a cambered airfoil profile measured as the difference between leading edge and trailing edge metal angles or a neutral airfoil profile in which the leading edge metal angle equals the trailing edge metal angle. Moreover, wings 38 can be coupled to projectile 10 such that a chord line extending linearly from the leading edge to the trailing edge of the airfoil forms an angle of attack with a freestream direction of airflow in the deployed position. Alternatively, wings 19 can extend parallel to the horizontal meridional plane of projectile 10.

In the stowed position, wings 38 are enclosed within body 24 such that chord line C of each wing 38 forms chord angle CA (see FIG. 2) with respective planes containing the chord line and extending parallel to a longitudinal dimension of respective wings 38 in the deployed position. That is to say, in the deployed position, a plane can be defined that contains the chord line of wing 38R and extends parallel to a longitudinal direction of wing 38R. In some embodiments, the plane can be defined as extending along the longitudinal dimension of wing 38R in the deployed position and parallel to the horizontal meridional plane of projectile 10. In still other embodiments, the plane can be defined as any plane parallel to the horizontal meridional plane. However defined, in the stowed position, the chord line of wing 38R forms chord angle CA with the plane defined by wing 38 in the deployed position. If wings 38 are twisted such that chord lines of successive sections taken normal to the longitudinal dimension are not coplanar, the chord line at a particular section, for example the wing tip or the lug-end of the wing, can be used to define chord angle CA in the stowed position. In the deployed position, each wing 38 rotates about its proximal end and through slots 42 to the deployed position shown in FIG. 1.

While projectile 10, as depicted in FIG. 1, is suitable for a portable mortar system, the general applicability of the present invention will be apparent to those skilled in the art. For instance, deployable wings 38 can be stowed within a missile, rocket body, or other vehicle.

Figure 2:
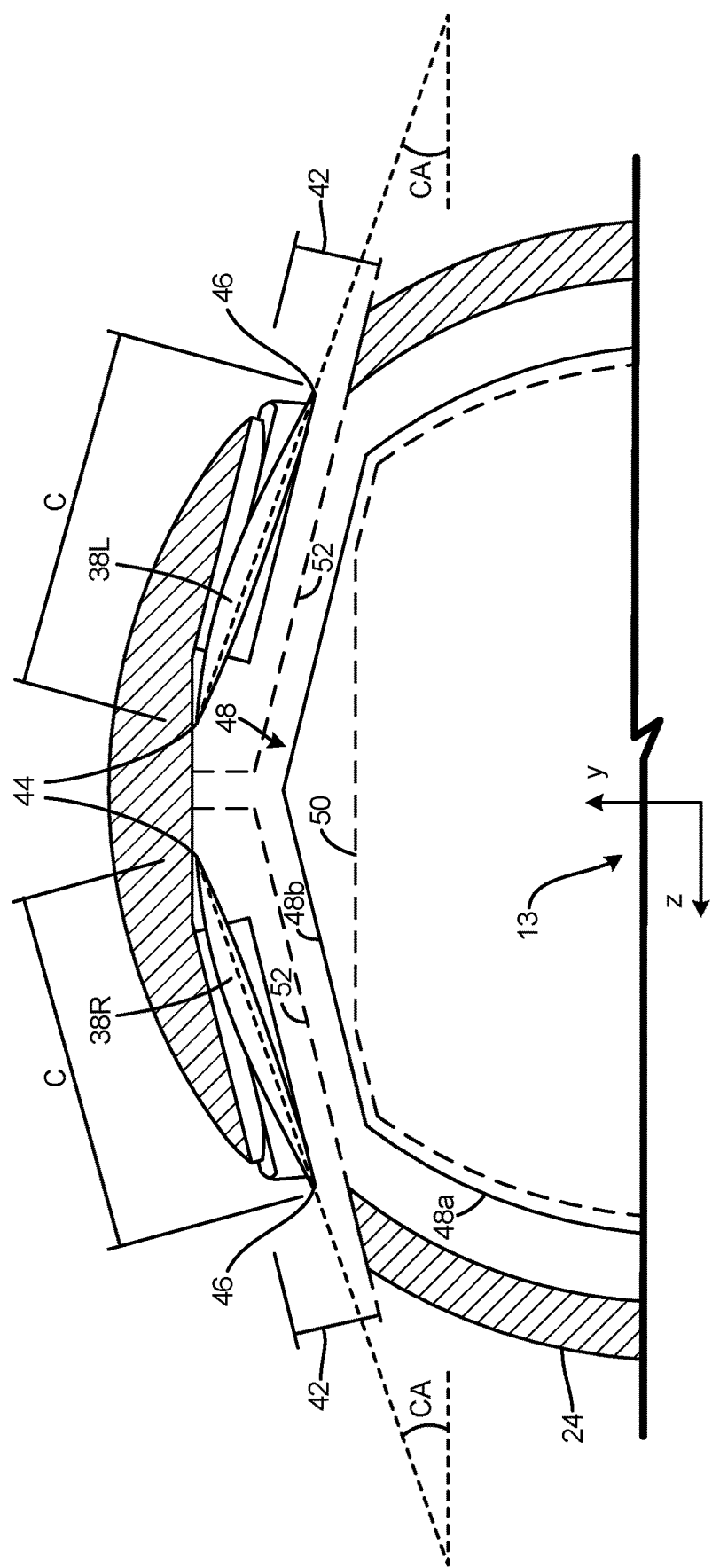
FIG. 2 is a cross-sectional view of the guided projectile taken at plane A-A showing the wings in a stowed position (i.e., deployment angle approximately equal to 0 degrees).

FIG. 2 depicts a partial cross-section of projectile 10 taken along plane A-A normal to longitudinal axis 12 and positioned between canards 36 and wings 38. Starboard wing 38R and port wing 38L are stowed in FIG. 2. Longitudinal dimensions of starboard wing 38R and port wing 38L extend parallel to longitudinal axis 12 of projectile 10. Chord lines C of each wing form angles CA with respective planes containing chord line C and extending parallel to a longitudinal direction of respective wings in the deployed position. For embodiments having wings 38 orientated horizontally in the deployed position, each wing 38 also forms chord angle CA with the horizontal meridional plane of projectile 10. As a result of chord angle CA, starboard wing 38R and port wing 38L closely conform to an interior surface of body 24 and permit payload area 48 to be larger than payload area 50, which is available when stowing wings horizontally (i.e., chord angle CA equal to 0 degrees) or when stowing both wings along a single plane.

Figure 3A:
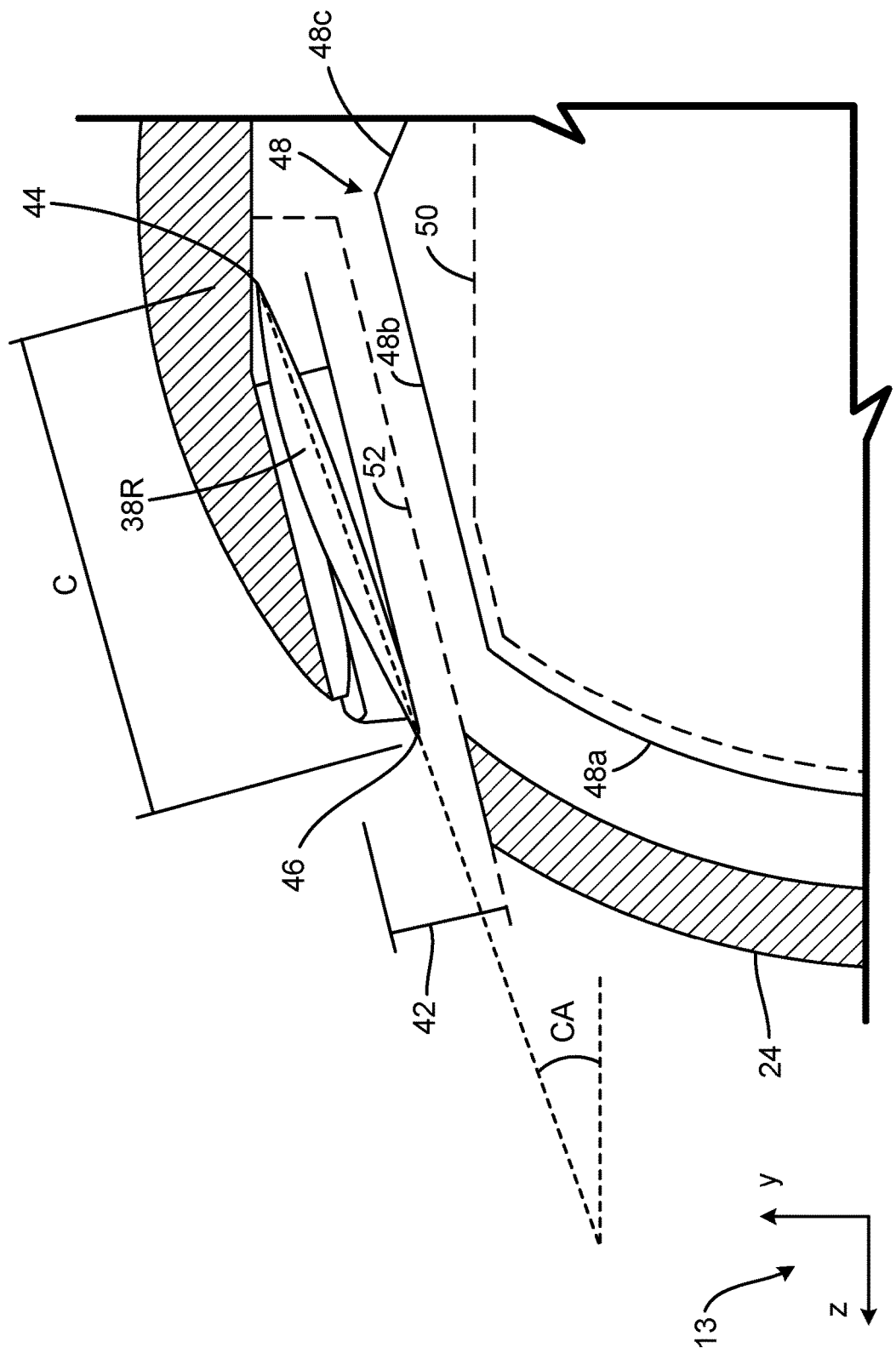
FIG. 3A is a cross-sectional view of the guided projectile taken at plane A-A showing the starboard wing in the stowed position (i.e., deployment angle approximately equal to 0 degrees).
Figure 3D:
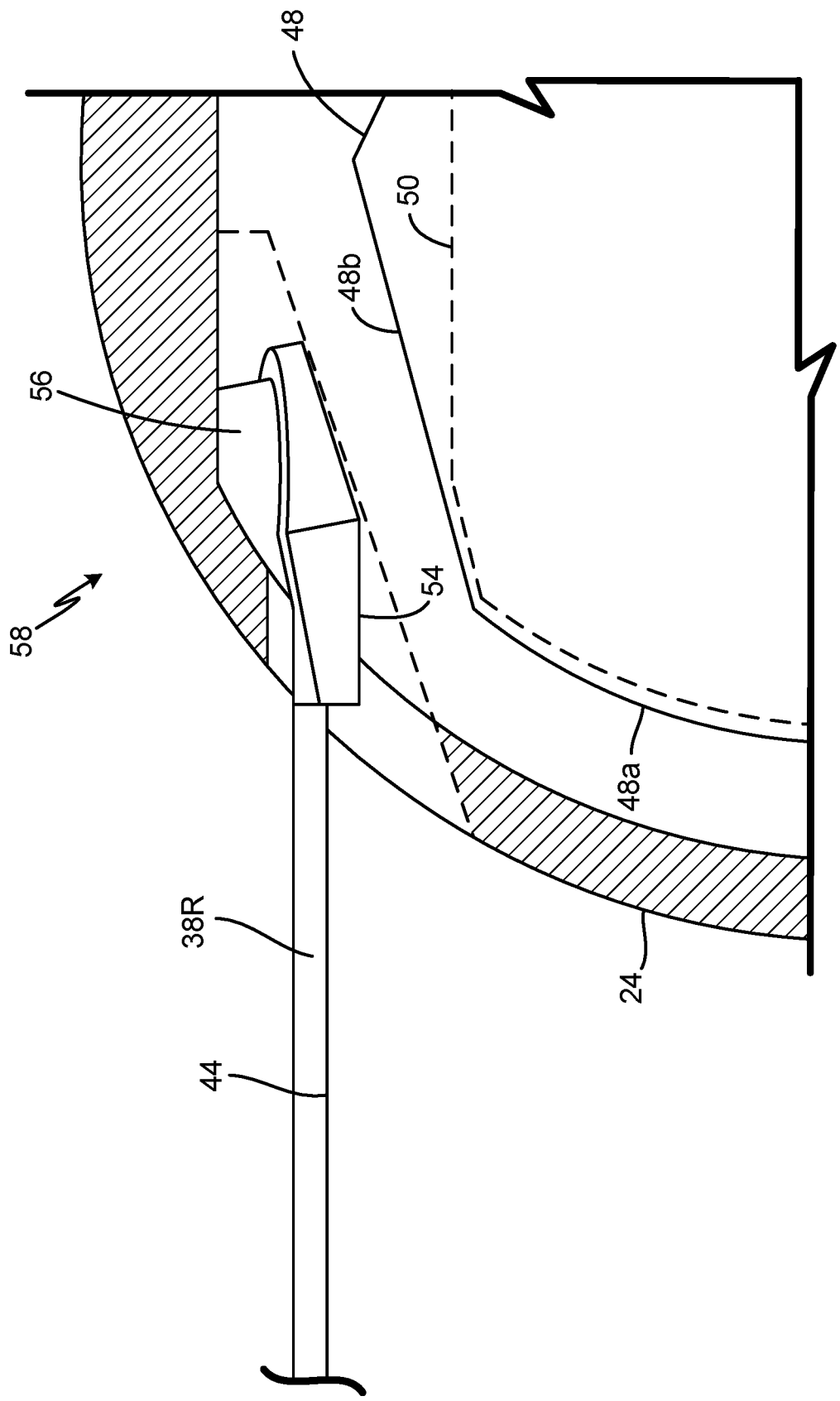
FIG. 3D is a cross-sectional view of the guided projectile taken at plane A-A showing the starboard wing in the deployed position (i.e., deployment angle approximately equal to 90 degrees).

FIGS. 3A, 3B, 3C, and 3D depict the deployment sequence of starboard wing 38R as viewed from cross-sections of projectile 10 taken along plane A-A. FIG. 3A depicts starboard wing 38R in a stowed position, and FIG. 3D depicts starboard wing 38R in a deployed position. FIGS. 3B and 3C depict starboard wing 38R in partially deployed positions. Although the following discussion describes deployment of starboard wing 38R and associated components, port wing 38L includes the same components and functions in the same manner as starboard wing 38R except that port wing 38L is configured as the mirror image of starboard wing 38R about the vertical meridional plane (i.e., plane X-Y of projectile coordinate system 13).

The degree of wing deployment is described by the deployment angle measured between longitudinal axis 12 and a projection of leading edge 44 of each wing 38 onto the horizontal meridional plane. Accordingly, a wing with a leading edge parallel to longitudinal axis 12 has a deployment angle equal to 0 degrees, and a wing in the deployed position has a positive deployment angle. Wings 38 can have a maximum deployment angle less than 90 degrees for forward-swept wings or can have a maximum deployment angle greater than 90 degrees for backward-swept wings. Alternatively, leading edges 44 of wings 38 can extend perpendicularly with respect to longitudinal axis 12, having a deployment angle equal to 90 degrees. In the embodiment depicted by FIG. 3A, leading edge 44 of starboard wing 38R forms a deployment angle approximately equal to 0 degrees. Furthermore, the deployment angle of starboard wing 38R is approximately 4 degrees in FIG. 3B, approximately 15 degrees in FIG. 3C, and approximately 90 degrees in FIG. 2D.

FIG. 3A depicts chord line C of starboard wing 38R in further detail. As noted above, chord line C is the linear distance extending from leading edge 44 to trailing edge 46 of each wing 38. In the stowed position, the chord angle is measured between chord line C and a plane containing chord line C and extending parallel to a longitudinal dimension of starboard wing 38R in the deployed position. In the depicted case, chord line C also forms chord angle CA with the horizontal meridional plane. As depicted in FIG. 3A, chord angle CA is acute, ranging between 0 degrees (i.e., parallel to the horizontal meridional plane of projectile 10) and 90 degrees (i.e., perpendicular to the horizontal meridional plane of projectile 10). The value of chord angle CA for a wing in the stowed position depends on a profile of an interior surface of body 24 and the length of chord line C. For example, a wider range of chord angles CA may be available for wings with relatively short chord lengths C since shorter chord lengths C can more easily fit within a given projectile body relative to larger chord lengths C.

To maximize payload volume 48, wings 38 closely conform to the interior surface of body 24. In other words, chord line C of wings 38 are angled to approximate a profile of the interior surface of body 24 such that leading edge 44 and trailing edge 46 of starboard wing 38R are immediately adjacent to the interior surface of body 24.

When wings 38 have a nonzero chord angle CA in the stowed position, cross-sectional area 48 is available for payload. By comparison, if wings 38 were deployed along a horizontal plane, cross-sectional area 50, represented by dashed lines, would be available for payload since chord line C would extend parallel to the horizontal meridional plane. The payload volume, therefore, is defined by cross-sectional area 48 or cross-sectional area 50 projected along a length of body 24. From this comparison, it is evident that additional cross-sectional area is available for payload when wings 38 are stowed with a nonzero chord angle CA.

Moreover, the shape of cross-sectional area 48 more-closely approximates a circular cross-section than cross-section 50, which permits cross-sectional area 48 to detonate more efficiently than cross-sectional area 50. Specifically, cross-section 48 includes circular arc 48a joined by linear side 48b that extends parallel to a side of keep-out region 52 required to store starboard wing 38R within body 24. While only one quadrant of cross-section 48 is depicted by FIG. 3A, cross-section 48 is symmetrical about vertical and horizontal meridional planes of projectile 10. Thus, cross-section 48 includes opposing circular arcs intersecting the horizontal meridional plane joined by opposing peaks formed by linear edges extending from opposing circular arcs and joined at an apex at the vertical meridional plane.

FIGS. 3B and 3C depict starboard wing 38R as it transitions from the stowed position depicted by FIG. 3A to the deployed position depicted by FIG. 3D. In the deployed position, starboard wing 38R extends parallel to the horizontal meridional plane. To facilitate the transition from the stowed position to the deployed position, each wing includes lug 54 that couples each wing 38 to respective mounts 56, which extend from the interior surface of body 24. Together, lug 54 and mount 56 form pivot 58 coupling a proximal end of starboard wing 38R to body 24.

In the following description, several pivot embodiments are described that can be used to permit wings 38 to move from a stowed position to a deployed position. Some of the embodiments are described with respect to starboard wing 38R while others are described with respect to port wing 38L. Whether described with respect to starboard wing 38R or port wing 38L, any of the following embodiments can be applied to the other of the starboard and port wings 38. In doing so, certain features and or coordinate systems may be mirrored about a vertical meridional plane of projectile 10 (i.e., the X-Y plane of coordinate system 13) as will be apparent from the description.

Figure 4A:
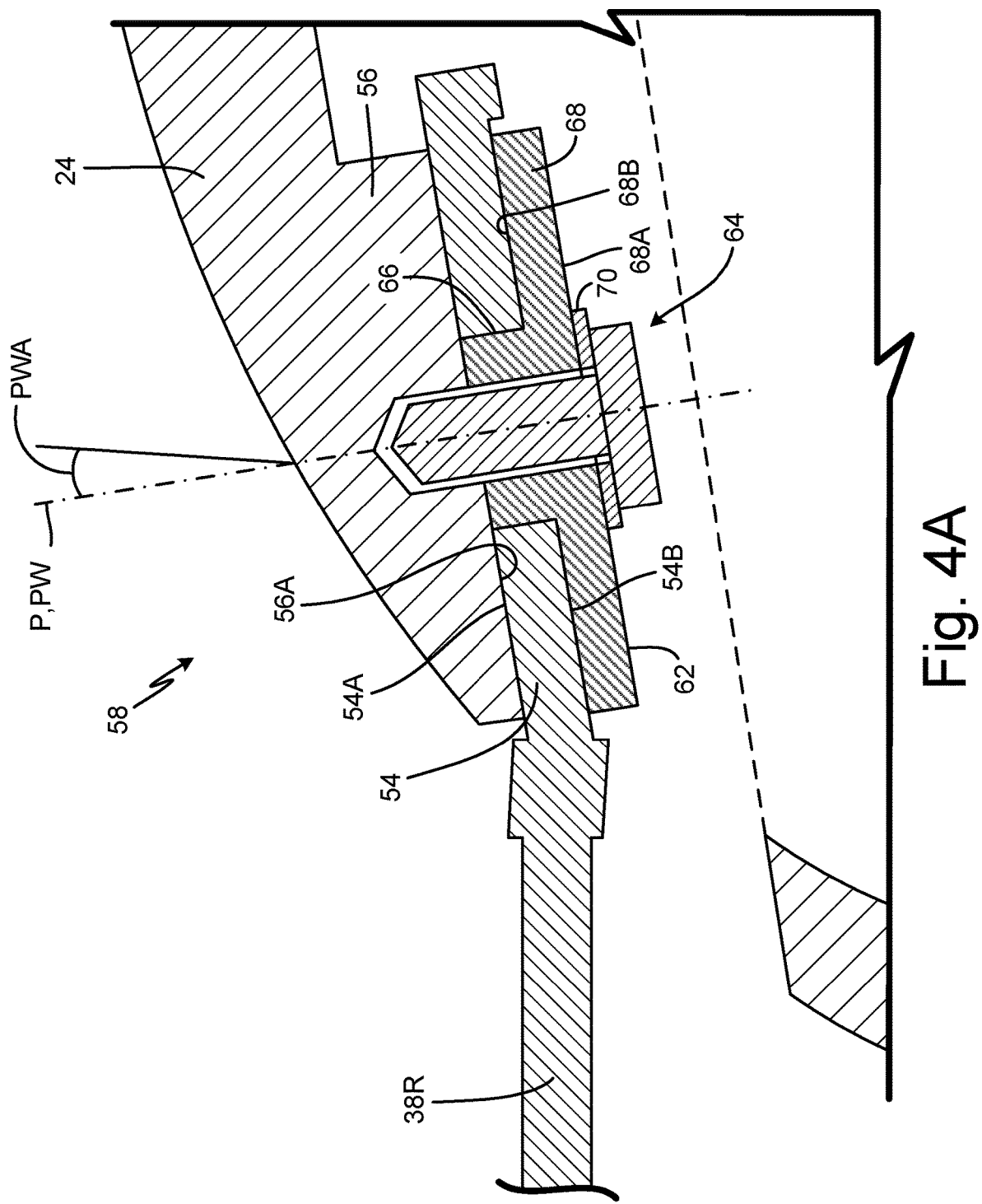
FIG. 4A is a cross-sectional view of the guided projectile taken through the starboard wing along a plane normal to a longitudinal axis of the projectile that shows an exemplary embodiment of a planar contact pivot.
Figure 4B:
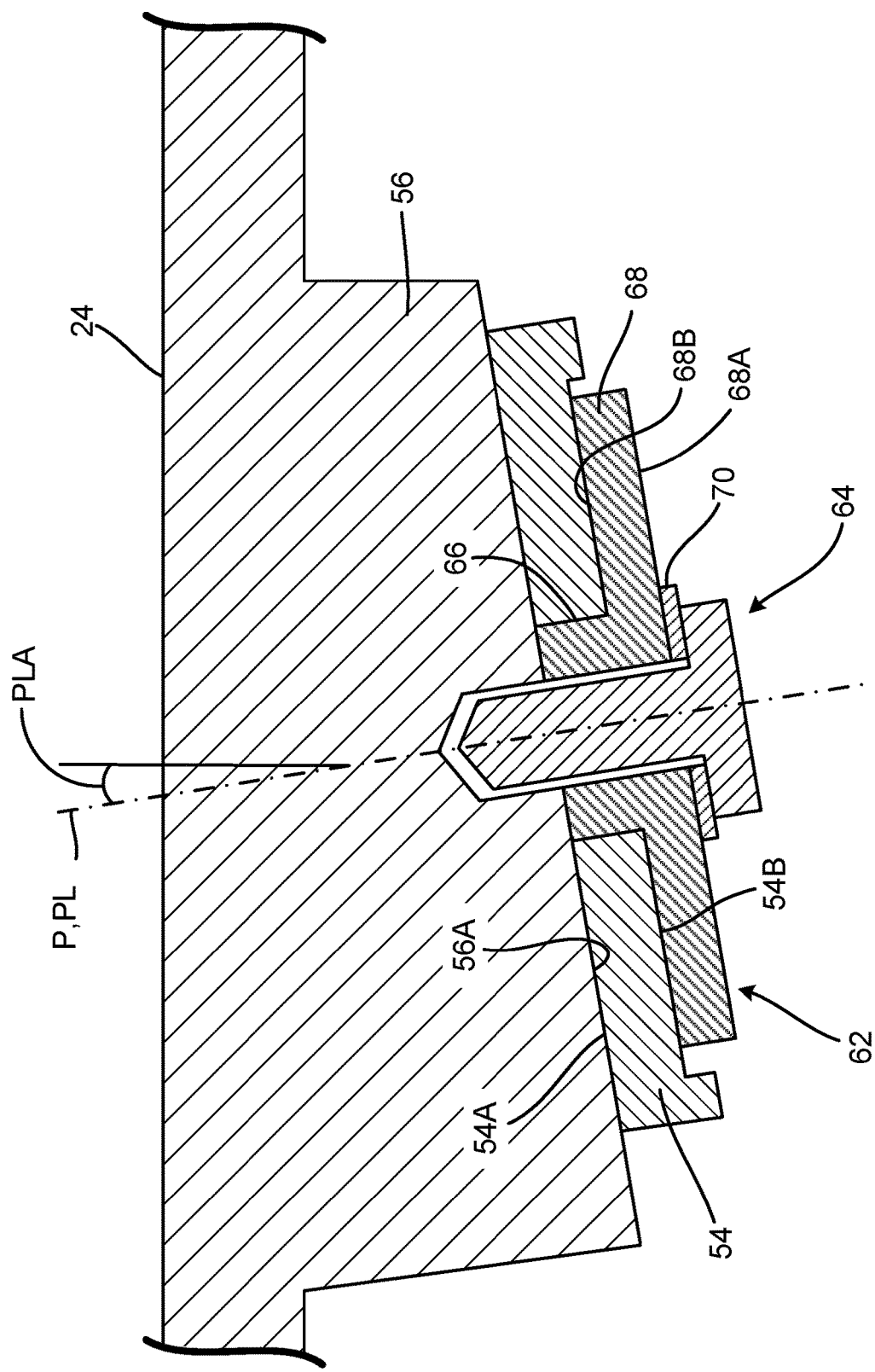
FIG. 4B is a cross-sectional view of the guided projectile taken through the starboard wing along a plane parallel to the longitudinal axis of the projectile that shows the planar contact pivot of FIG. 4A.

FIGS. 4A and 4B are cross-sectional views taken through starboard wing 38R, lug 54, and mount 56 depicting additional features of pivot 58. The cross-sectional plane of FIG. 4A is parallel to plane A-A (see FIG. 1), and the cross-sectional plane of FIG. 4B is perpendicular to plane A-A and extends along longitudinal axis 12. As shown by FIGS. 4A and 4B, lug 54 and mount 56 have opposing parallel surfaces 54A and 56A, respectively, which are normal to pivot axis P and thus perpendicular to lateral projection PW and longitudinal projection PL of pivot axis P. As a result, lateral projection PW of pivot axis P forms angle PWA with the vertical meridional plane, and longitudinal projection PL of pivot axis P forms angle PLA with a plane perpendicular to the horizontal and vertical meridional planes.

When lateral projection angle PWA and longitudinal projection angle PLA are equal, the magnitude of angles PWA and PLA are equal to half of the selected chord angle CA of wings 38 in the stowed position. The resultant angle PA, as depicted by FIGS. 4A and 4B, inclines pivot axis P laterally outward from body 24 and longitudinally forward towards nose 20 to permit wings 38 to deploy from a stowed position with a nonzero chord angle to a neutral deployed position in which wings 38 extend parallel to a horizontal meridional plane. Furthermore, when pivot axis P is inclined laterally outward and longitudinally forward, wing tips 60 are disposed between lugs 54 (i.e., the proximal end of wing 38R) and nose 20 in the stowed position, and rotate aft about pivot axis P towards tail section 18 to transition to the deployed position.

Alternatively, pivot axis P can be inclined laterally outward from body 24 and longitudinally aft towards tail section 18 to permit wing tips 60 to be disposed between lugs 54 and tail section 18 in the stowed position. Contrary to the prior embodiment, wings 38 in this embodiment rotate wing tips 60 forward about pivot axis P towards nose 20 to transition to the deployed position. The longitudinal projection angle PLA of this embodiment are angled towards tail section 18, or in a direction opposite the longitudinal projection angle depicted by FIG. 4B.

In other embodiments, lateral projection angle PWA can be greater than longitudinal projection angle PLA to provide improved deployment of wings 38 and to reduce a width of slots 42. However, when lateral projection angle PWA is greater than longitudinal projection angle PLA, respective chord lines C of wings 38 form non-zero angles with the horizontal meridional plane of projection 10 in the deployed position and, thus, form non-zero angles of attack. The angle of attack of wings 38 can be counteracted by orientating lug 54 at an angle relative to chord line C when viewed from the wing tip towards the lug end of wing 38. For instance, the angle of lug 54 relative to chord line C can be equal to one half of the difference between the lateral projection angle PWA and longitudinal projection angle PLA.

Lugs 54 can be coupled to mount 56 using any suitable method that results in an inclined pivot axis P as described above. In some embodiments, lug 54 is restrained between mount 56 and bushing 62 with fastener 64. In this instance, bushing 62 includes collar 66 and flange 68 extending perpendicularly outward from collar 66 relative to pivot axis P. Collar 66 has a cylindrical exterior surface and bore that is concentric with pivot axis P. The collar bore forms a sliding or location fit with a cylindrical shaft of fastener 64. Flange 68 has parallel surfaces 68A and 68B. Surface 68B is opposed to and abuts surface 54B of lug 54, which is parallel to surface 56A and extends along a side of lug 54 opposite surface 56A. Surface 68A forms a side of flange 68 that is opposite and parallel to abutting surface 68B and bears directly against a head of fastener 64 or washer 70 disposed between surface 68B and the head of fastener 64. Fastener 64 may have external threads at an end opposite the fastener head to engage corresponding internal threads within a mating bore of mount 56. With this arrangement, it is evident that a torque applied to fastener 64 about pivot axis P secures washer 70, bushing 62 and lug 54 to mount 56. To facilitate free rotation of wing 38 about pivot axis P, a length of collar 66 measured from and perpendicular to surface 68B of bushing 62 is larger than a thickness of lug 54 measured between surfaces 54A and 54B. Thus, a clearance between wing lug 54 and opposing surfaces of mount 56 and bushing 62 permit free rotation of wing 38 about pivot axis P. Limiting this clearance or gap between flange 68 and mount 56 ensures aerodynamic performance of wings 38 and precise control of wings 38 during deployment.

Since pivot 58 permits wings 38 to rotate freely about pivot axis P, wings 38 are restrained in the stowed position using a mechanical latch (not shown) of known design. For instance, wings 38 can be restrained by a pin extending into a recess within respective tips of wings 38, which can be retracted by a change in centrifugal force on wings 38 or by an electrical or pneumatic actuation means. With the mechanical latch, wings 38 can be restrained during an initial portion of the trajectory, being deployed only after projectile 10 is stabilized.

In another exemplary embodiment, pivot 58A is depicted by FIGS. 5A and 5B, which are cross-sectional views taken through starboard wing 38R, lug 54, and mount 56. As with FIGS. 4A and 4B, the cross-sectional plane of FIG. 5A is parallel to plane A-A shown in FIG. 1, and the cross-sectional plane of FIG. 5B is perpendicular to plane A-A and extends along longitudinal axis 12. Pivot 58A functions in essentially the same manner as pivot 58 except for certain features of the pivot as described below.

Pivot 58A includes lug 54 disposed between washer plate 72 and bushing 74, and coupled to mount 56 via fastener 75, which extends through respective bores of bushing 74, lug 54, washer plate 72 and into and a threaded hole of mount 56. In a manner similar to pivot 58, pivot 58A permits starboard wing 38R to transition from a stowed position within body 24 to a deployed position extending outward from body 24 by rotating about pivot axis P. Pivot axis P can be inclined laterally outward and longitudinally forward to permit wing tips 60 to be disposed between lugs 54 and nose 20 in the stowed position. Alternatively, pivot axis P can be inclined laterally outward from body 24 and longitudinally aft towards tail section 18 to permit wing tips 60 to be disposed between lugs 54 and tail section 18 in the stowed position. Accordingly, the magnitudes of lateral projection angle PWA and longitudinal projection angle PLA can be selected in the same manner as pivot 58 to achieve a stowed position for wings 38R in which chord line C of wing 38R forms chord angle CA as described with respect to pivot 58.

In this embodiment, bushing 74 includes flange 76 extending outward from collar 78. Collar 78 extends perpendicularly from flange 76 having a cylindrical exterior surface parallel to pivot axis P. Bore 80 extends through bushing 74 and is concentric to the cylindrical exterior surface of collar 78. A centerline axis of bore 80 is aligned with and parallel to pivot axis P. Flange 76 extends from an end of collar 78 in a radially outward direction relative to the centerline axis of bore 80 and defines parallel surfaces 76A and 76B that are normal to pivot axis P and the centerline axis of bore 80. At an end distal from flange 76, collar 78 includes rabbet 82 defined by cylindrical surface 82A and end face 82B. Rabbet 82 is adapted to receive washer plate 72. Moreover, bore 80 can include a counterbore or chamfer to accommodate a head of fastener 75. In the embodiment shown in FIGS. 5A and 5B, fastener 75 is flat head machine screw. As such, the angled surface of the fastener head abuts a chamfered surface of bore 80.

Washer plate 72 includes parallel surfaces 72A and 72B spaced apart to define a thickness of washer plate 72. Washer bore 84 extends perpendicularly through washer plate 72 from surface 72A to surface 72B and is sized to accommodate cylindrical surface 82A of rabbet 82.

Mount 56 defines surface 56A normal to pivot axis P and includes threaded hole 86 adapted to receive fastener 75 and counterbore 88 adapted to receive cylindrical surface 82A of collar 78.

Lug 54 defines parallel surfaces 54A and 54B that are spaced to define a lug thickness. Lug bore 90 is cylindrical and extends through lug 54 from surface 54A to surface 54B. Lug bore 90 may include a chamfer to provide clearance to a fillet of bushing 74 between flange 76 and collar 78.

As assembled and shown in FIGS. 5A and 5B, washer plate surface 72A abuts mount surface 56A, and washer plate surface 72B abuts rabbet end face 82B. The head of fastener 75 engages surfaces of the bushing bore chamfer and thereby develops a clamping force through bushing collar 78, washer plate 72, and mount 56. Alignment of mount 56, washer plate 72, and bushing 74 is provided by cylindrical surface 82A of rabbet 82, which is adapted to engage mount counterbore surface 88 and washer plate bore 84. The relative dimensions between cylindrical surface 82A and mount hole counterbore 88 as well as between cylindrical surface 82A and washer plate bore 84 can be selected to provide a locational clearance fit, a locational transition fit, or a locational interference fit as defined by American National Standard Institute (ANSI) B4.1-1967.

With this assembly, the perpendicular distance between flange surface 76B and rabbet face 82B, or distance D, can be greater than or equal to lug thickness T to provide clearance between lug 54 and respective components of pivot 58A. Furthermore, the diameters of lug bore 90 and the exterior cylindrical collar surface can be selected to provide a locational clearance fit, a locational transition fit, or a locational interference fit as is known in the art. Using this assembly, starboard wing 38R is coupled to body 24 at pivot 58A, and can be stowed within body 24 of projectile 10 with a non-zero chord angle CA while deploying to a different chord angle orientation.

The foregoing embodiments rely on angled planar surfaces of the wing lug abutting corresponding components of the pivot, or planar contact, to guide the wing from an angled stowed position to a deployed position. While the angled orientation of these planar surfaces permit the wing to transition from an angled stowed position to a deployed position, the motion between the stowed and deployed positions cannot deviate from the path defined by pivot axis P and planar surfaces of mount 56 and lug 54. In order to provide a greater amount of control over the motion of the wing from the stowed position to the deployed position, cam followers fixed to the body of the projectile in conjunction with a cam groove and spherical bearing surface can be used to define an orientation of the wing along the deployment path. Alternatively, cam followers fixed to the wing lug can be used in conjunction with a spherical bearing surface and cam grooves on the projectile body or mount to define the orientation of the wing along the deployment path. Pivot 58B, as described below, is an exemplary embodiment utilizing cam followers affixed to the projectile body. Although, it will be understood that the same techniques are applicable to embodiments have cam followers fixed in space with respect to the wing lug.

Figure 6A:
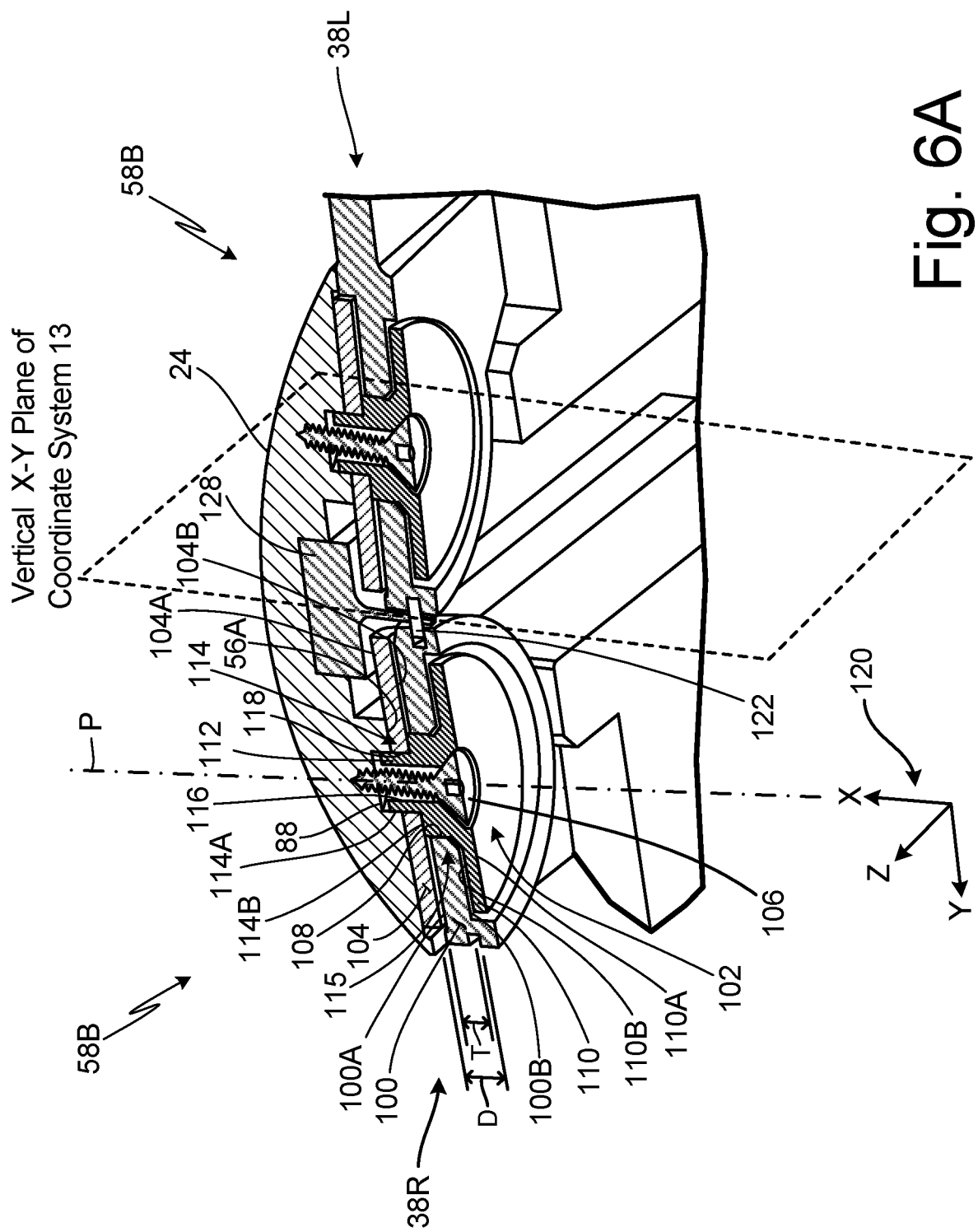
FIG. 6A is an isometric view showing an aftward-looking view of a sectional plane intersecting an exemplary embodiment of a cam-guided pivot.
Figure 6B:
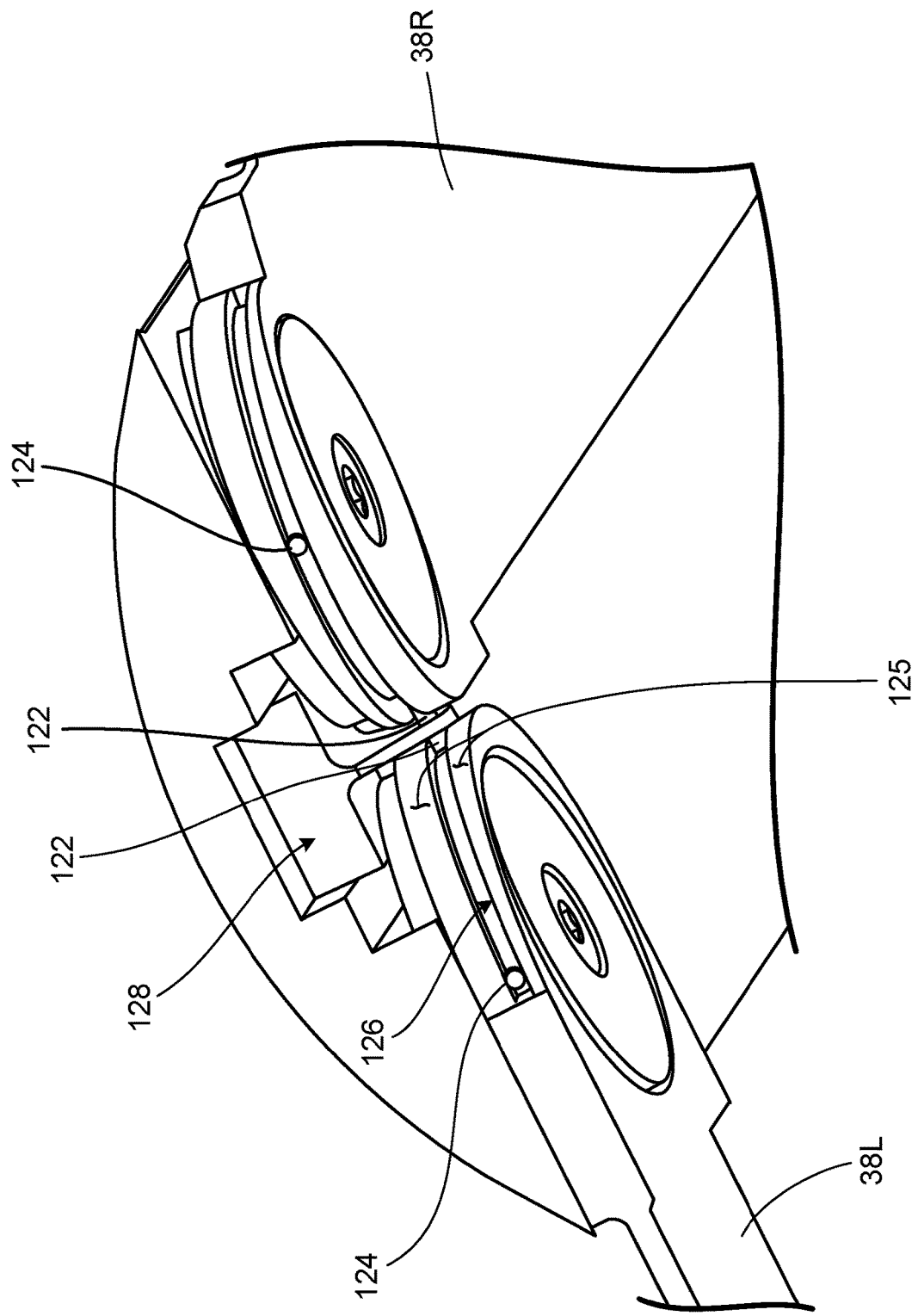
FIG. 6B is an isometric view showing a forward-looking view of a sectional plane intersecting the guided projectile at a location positioned aft of the cam-guided pivot of FIG. 6A.

Pivot 58B utilizes point contacts provided by cam followers affixed to the projectile body and paired with a spherical bearing to guide the orientation of wings 38 from the stowed position to the deployed position. FIG. 6A is an isometric view showing a sectional plane cutting through pivot 58B that looks upward towards wings 38 and aftwards towards tail section 18 (see FIG. 1). FIG. 6B is a forward-looking isometric view showing a sectional plane cutting through projectile 10 along a position aft of pivots 58B. To illustrate both deployed and stowed wing positions, FIGS. 6A and 6B depict starboard wing 38R in the stowed position, having the tip of starboard wing 38R in the forward stowed position between lug 100 and nose 20 (not shown in FIG. 6A) and depict port wing 38L is in the deployed position extending away from body 24. While the following describes pivot 58B with respect to starboard wing 38R, the pivot for port wing 38L will be functionally identical to the pivot described for starboard wing 38R except that certain features will be mirrored with respect to the vertical plane of projectile 10 (i.e., the X-Y plane of coordinate system 13).

As with the above described embodiments, starboard wing 38R extends in a longitudinal dimension from lug 100 to a wing tip (not shown) and along chord line C (not shown) defined as the linear distance from the leading edge to the trailing edge of starboard wing 38R. Lug 100 is disposed between bushing 102 and washer plate 104 and is secured to mount 56 via fastener 106. Lug 100 defines parallel surfaces 100A and 100B, which can be recessed into lug 100 as shown or can form upper and lower surfaces of lug 100 generally corresponding to the upper and lower surfaces, respectively, of starboard wing 38R. Lug 100 includes bore 108 having a centerline that extends perpendicularly through lug 100 from surface 100A to surface 100B. The walls of bore 108 are contoured to define a spherical bearing surface.

Bushing 102 includes flange 110 extending outward from an end of collar 112. Surfaces 110A and 110B of flange 110 are parallel to each other, and each of surfaces 110A and 110B is normal to a centerline axis of collar 112. Collar 112 extends perpendicularly from flange 110 along its centerline axis. At an end of collar 112 distal from flange 110, collar 112 includes rabbet 114 defined by cylindrical face 114A and end face 114B. The exterior surface of collar 112 forms a spherical bearing surface adapted to mate with the spherical bearing surface of lug bore 108. Together the spherical bearing surfaces of lug bore 108 and collar 112 form spherical bearing 115. Bore 116 extends through flange 110 and collar 112 of bushing 102 along the centerline axis of collar 112. Like bore 80, bore 116 can be cylindrical, and an end of bore 116 can include a counterbore or chamfer to accommodate a head of fastener 106.

Washer plate 104 includes parallel surfaces 104A and 104B spaced apart to define a washer plate thickness. Washer plate bore 118 extends perpendicularly through washer plate 104 from surface 104A to surface 104B and is sized to accommodate cylindrical surface 114A of rabbet 114.

Mount 56 has the same features as described with respect to the previously described embodiments (e.g., as shown in FIGS. 5A and 5B). However, in this embodiment, surface 56A abuts washer plate surface 104A and receives cylindrical surface 114A of rabbet 114 in counterbore 88.

As assembled, washer plate surface 104A abuts mount surface 56A, and washer plate surface 104B abuts rabbet end face 114B. The head of fastener 106 engages chamfered surfaces of bore 116 and thereby develops a clamping force through bushing collar 112, washer plate 104, and mount 56. Alignment of mount 56, washer plate 104, and bushing 102 is provided by cylindrical rabbet surface 114A adapted to engage counterbore surface 88 and washer plate bore 118. The relative dimensions between cylindrical surface 114A and mount hole counterbore 88 as well as between cylindrical surface 114A and washer plate bore 118 can be selected to provide a locational clearance fit, a locational transition fit, or a locational interference fit in the same way as the embodiment depicted by FIGS. 5A and 5B. To allow spherical bearing 115 freedom of rotational movement, bushing collar 112 and lug 100 are sized such that distance D is larger than lug thickness T in which distance D is the perpendicular distance measured between washer plate surface 104B and bushing flange surface 110B, and lug thickness T is the perpendicular distance between lug surfaces 100A and 100B. With this arrangement, clearance exists between lug surface 100A and washer plate surface 104B and between lug surface 100B and flange surface 110B.

Spherical bearing 115 couples lug 100, and therefore, wing 38R to body 24 at mount 56. Translational movements of lug 100 relative to body 24 are restrained by the spherical bearing interface while rotational movements are permitted. In order to better understand these rotational movements and how each are restrained, pivot coordinate system 120, defined by mutually orthogonal axes, can be defined for starboard wing 38R. The X-axis of pivot coordinate system 120 is collinear with pivot axis P, which in turn may be angled as described previously with respect to other embodiments. The Z-axis of pivot coordinate system 120 extends parallel to a longitudinal dimension of wing 38R towards wing tip 60 of starboard wing 38R. The Y-axis of pivot coordinate system 120 extends parallel to chord line C of wing 38R, or in other words, extends along the chordwise dimension of starboard wing 38R. While coordinate system 120, as shown in FIG. 6A, is offset from lug 100 for clarity, the origin of coordinate system 120 can be located anywhere along pivot axis P. When pivot axis P is angled radially outward and axially forward and wing 38R is in the stowed position, the Z-axis of pivot coordinate system 120 extends towards nose 20 of projectile in a downward direction (i.e., towards longitudinal axis 12 with wings in a high-mount configuration), and the Y-axis of pivot coordinate system 120 extends laterally outward in a downward direction. Additionally, pivot coordinate system 120 is local to starboard wing 38R and, thus, remains stationary relative to starboard wing 38R as wing 38R rotates from the stowed position to the deployed position.

Using pivot coordinate system 120, the spherical bearing formed by lug bore 108 and collar 112 permits rotation about pivot axis P, or the X-axis of pivot coordinate system 120, as well as the Y-axis and the Z-axis of pivot coordinate system 120. To restrain the Y-axis and Z-axis rotations, at least two cam followers are used in conjunction with a cam groove formed in a peripheral side face of lug 100 in the manner described below.

For example, pivot 58B can include cam follower 122 and cam follower 124 (see FIG. 6B) restrained within cam groove 126 formed in peripheral side surface 125 of lug 100. Peripheral side surface 125 extends between and joins lug surfaces 100A and 100B and forms a radially outer peripheral surface of lug 100 relative to pivot axis P (and the X-axis of pivot coordinate system 120). In this example, cam follower 122 is positioned along the Y-axis of pivot coordinate system 120, and cam follower 124 is positioned along the Z-axis of pivot coordinate system 120, each with the wing in the stowed position. Each of cam followers 122 and 124 is fixed relative to body 24 by a recess formed by body 24 or by a separate mount affixed to body 24. For instance, cam follower 122 is restrained relative to body 24 via follower mount 128, and cam follower 124 is restrained relative to body 24 via a recess within body 24 itself (not shown). With this arrangement, cam followers 122 and 124 remain stationary as starboard wing 38R pivots from the stowed position to the deployed position. Moreover, cam followers 122 and 124 working in conjunction with cam groove 126 restrain rotation of wing 38R about the Y-axis and the Z-axis of pivot coordinate system 120. While cam followers 122 and 124 are positioned along the Y-axis and the Z-axis, respectively of pivot axis 120 in the stowed position, other positions could be used so long as cam followers 122 and 124 are not positioned along the same axis (i.e., cam followers 122 and 124 are noncollinear). Furthermore, as shown, cam follower 122 is angularly spaced from cam follower 124 by 90 degrees. Although, cam followers 122 and 124 can be angularly spaced by more than or less than 90 degrees.

Cam groove 126 defines upper guiding surface 126A, lower guiding surface 126B, and base surface 126C. Guiding surfaces 126A and 126B are spaced from each other to accommodate a diameter or thickness of cam followers 122 and 124. Base surface 126C joins upper guiding surface 126A to lower guiding surface 126B to complete cam groove 126. The groove thickness measured between upper guide surface 126A and lower guide surface 126B is sized to form a sliding or location fit with each of cam followers 122 and 124. Base surface 126C is offset into lug 100 a distance from the peripheral surface to provide clearance to each of cam followers 122 and 124. With this arrangement, cam followers 122 and 124 slide within groove 126 as starboard wing 38R pivots from the stowed position to the deployed position.

To mimic the deployment path of pivots 58 and 58A, guiding surfaces 126A and 126B of cam groove 126 would extend parallel to surfaces 100A and 100B for the entire length of groove 126. In this arrangement, however, cam follower 122 slides along a first portion of groove 126 while cam follower 124 slides along a second portion of groove 126, each portion of groove 126 having a stowed position and a deployed position for each cam follower. If the deployment angle is 90 degrees and if cam follower 122 is spaced from cam follower 124 by 90 degrees, the deployed position of cam follower 122 along groove 126 corresponds to the stowed position of cam follower 124 along groove 126.

Guiding surfaces 126A and 126B can deviate upward (i.e., in a positive X-axis direction of pivot axis 120) or downward (i.e., in a negative X-axis direction of pivot axis 120), starboard wing 38R will deviate from the path followed by a planar contact pivot. For instance, when guiding surfaces 126A and 126B deviate upward or downward along a portion of groove 126 corresponding to cam follower 122, starboard wing 38R rotates about the Z-axis of pivot coordinate system 120 in the stowed position. Similarly, when guiding surfaces 126A and 126B deviate upward or downward along a portion of groove 126 corresponding to pin 124, starboard wing 38R rotates about Y-axis of pivot coordinate system 120 in the stowed position. Depending on the deployment angle of starboard wing 38R, the deviations of guide surfaces 126A and 126B can produce: 1) rotation about the longitudinal dimension of the wing (i.e., the Z-axis of pivot coordinate system 120), 2) tilt of the wing such that the wing tip is displaced along the X-axis of pivot coordinate system 120 relative to lug 100, or 3) a combination of longitudinal rotation and wing tilt, each defined as a function of deployment angle.

FIG. 6C depicts lug 100 of starboard wing 38R with cam groove 126, and FIG. 6D is a developed view of cam groove 126 employed on starboard wing 38R in FIGS. 6A-6C. With continued reference to FIGS. 6C and 6D, cam follower 122 slides within cam groove 126 between location A and location B defining first portion 130 of groove 126. Cam follower 124 slides within groove 126 between location B and location C defining second portion 132 of groove 126. In first portion 130, surfaces 126A and 126B deviate downward (i.e., towards lug surface 100B) relative to grooves lines parallel to surfaces 100A and 100B represented by dashed lines 134. This region coincides with location A, or the stowed position of follower 122. As a result, starboard wing 38R forms chord angle CA in the stowed position such that leading and trailing edges 44 and 46 of starboard wing 38R are immediately adjacent to an inner surface of body 24 as disclosed in prior embodiments. Second portion 132 remains parallel to lug surfaces 100A and 100B to produce a deployment path similar to planar contact embodiments of pivot 58. Using this profile for cam groove 126, first portion 130 of groove 126 can maintain a larger chord angle CA than would otherwise be possible with planar contact pivots by having surfaces 126A and 126B deviate downward relative to dashed lines 134. Accordingly, starboard wing 38R can be stored with chord angle CA and be deployed to a horizontal orientation (i.e., a chord line parallel to a horizontal plane of projectile 10). Additionally, deployment of starboard wing 38R can maintain a higher chord angle CA than would otherwise by possible over an initial portion of the deployment path to facilitate deployment of wing 38R through slot 42 (see FIG. 1). For example, pivot 58B can deploy wing 38R along a path that maintains a constant chord angle CA or that changes at a lesser rate relative to an intermediate portion of the deployment path over an initial portion of the deployment path corresponding to wing 38R passing through slot 42 to facilitate smaller slot geometry than would be possible with planar contact pivots.

However, other cam groove profiles can be selected for other purposes. In each case, the shape or contour of cam groove 126 can be defined by selecting a desired chord angle CA as a function of deployment angle. For a given orientation of pivot axis P and fixed locations of followers 122 and 124, control points of cam groove 126 can define a smooth and continuous curve corresponding to each desired chord angle CA and deployment angle point. Surfaces 126A and 126B conform to the control point curve, each being spaced therefrom to define the groove thickness.

Figure 7A:
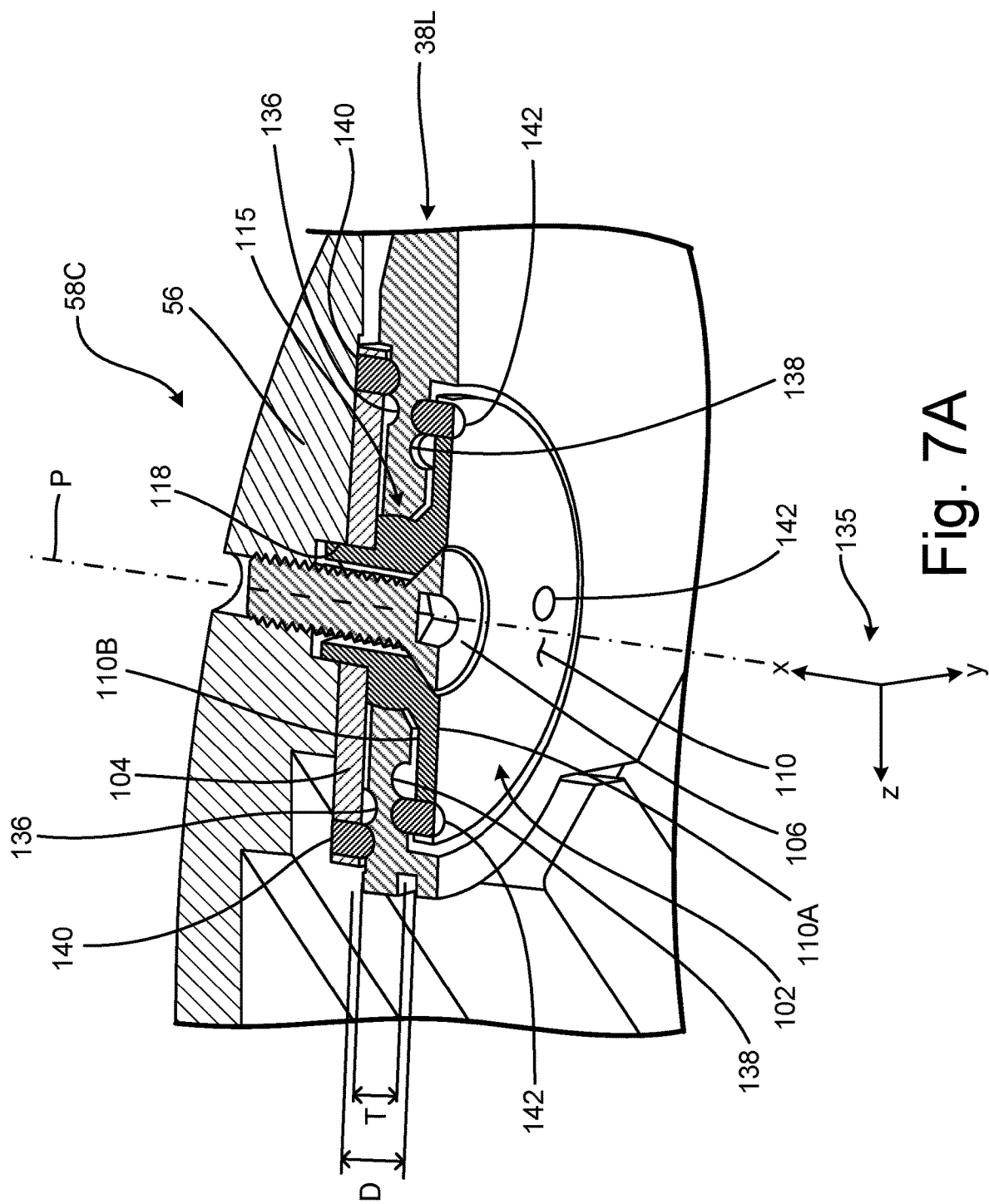
FIG. 7A is an isometric view showing an aftward view of a section plane intersecting another exemplary embodiment of a cam-guided pivot.

In another exemplary embodiment depicted by FIG. 7A, pivot 58C utilizes point contact along cam grooves formed within lug surfaces 100A and 100B paired with a spherical bearing to guide the orientation of wings 38 from the stowed position to the deployed position. FIG. 7A is an isometric view showing a sectional plane intersecting port wing 38L, lug 100, washer plate 102, bushing 104, and fastener 106, which include the same features described with respect to the embodiment depicted by FIGS. 6A-6D with certain exceptions and/or additions. For instance, instead of restraining rotational moments about spherical bearing 115 with groove 126 and cam followers 122 and 124 alone, lug 100 can alternatively or additionally include one or more grooves 136 formed by a recess within surface 100A and one or more grooves 138 formed by a recess within surface 100B. As with the previously described cam-guided pivot embodiment, thickness T of lug 100 is less than distance D between bushing flange surface 110B and washer plate surface 104B to form gaps between lug surfaces 100A and 100B and washer plate 104 and bushing flange 110, respectively.

Like starboard wing 38R, rotational movements of port wing 38L are understood in reference to pivot coordinate system 135 defined by three mutually orthogonal axes. Pivot coordinate system 135 is like coordinate system 120 defined for starboard wing 38R. However, pivot coordinate system 135 is local to port wing 38L. The X-axis of coordinate system 135 is collinear with pivot axis P of wing 38L. The Z-axis extends parallel to a longitudinal dimension of port wing 38L. The Y-axis extends parallel to chord line C, or a chord-wise direction, of wing 38L and, in the deployed position shown by FIG. 7A, extends in an axial direction towards trailing edge 46 of port wing 38L.

Each of grooves 136 and 138 follows an arc about the centerline axis of lug bore 108 that is aligned with the X-axis of pivot coordinate system 135. The depth of each groove 136 is measured as the perpendicular distance from lug surface 100A to the bottom-most point of groove 136 at a particular position along the arc length of groove 136. Similarly, the depth of each groove 138 is measured as the perpendicular distance from lug surface 100B to the bottom-most point of groove 138 at a particular position along the arc length of groove 138. The depth of grooves 136 and 138 varies along respective arc lengths to vary the orientation of port wing 38L as wing 38L moves from the stowed position to the deployed position.

In the embodiment depicted by FIG. 7A, washer plate 104 retains four pins 140 (only two pins 140 are shown) equallyspaced about the centerline axis of washer plate bore 118 and the X-axis of pivot coordinate system 135. Because four pins 140 are used and the deployment angle is at least 90-degrees in the disclosed embodiment, pins 140 form two pairs of 180-degree-spaced pins, each pair of pins 140 disposed along a different common radius. This arrangement retains independent control of each of the four pins 140. Otherwise, if all four pins 140 are disposed along a common radius, the stowed position of one of the pins would dictate the deployed position of an adjacent pin 140 since portions of groove 136 corresponding to each pin 140 would overlap. This would also be true for different numbers of pins with corresponding deployment angle ranges (e.g., three pins with at least a 120-degree deployment sweep or five pins with at least 72-degree deployment sweep). Bushing 106 retains another four equally-space pins 142 (only three pins 142 are shown). Pins 142 also form two pairs of 180-degree-spaced pins, each pair disposed along a different common radius relative to the centerline axis of bushing bore 116. Each of pins 140 and pins 142 have a cylindrical shape terminating with a hemispherical free end adapted to engage one of the grooves 136 and 138 in lug surfaces 100A and 100B.

While four pins 140 and four pins 142 are used in the present embodiment, a lessor or greater number of pins 140 and 142 could be used. For instance, embodiments using two of each of pins 140 and 142 rely on spherical bearing 115 to establish the orientation of wing 38L. However, since manufacturing tolerances of spherical bearing 115 may permit undesirable deviations from the intended deployment path, arrangements of at least three pins 140 and at least three pins 142 can be used to define the chord angle CA of wing 38L along the deployment path. While spherical bearing 115 couples lug 100 of port wing 38L to mount 56, the orientation of wing 38L along the deployment path can be limited by pins 140 and 142 for which tighter manufacturing tolerances are more-easily obtained. Increasing the number of pins 140 and pins 142, such as depicted by FIG. 7A, reduces the difference in restraining moment arm associated with a rotational moment applied about an axis intersecting pins 140 and pins 142 and a rotational moment applied about an axis extending between pins 140 and pins 142. Accordingly, increasing the number of pins 140 and pins 142 improves stability of pivot 58C.

The profiles of each of cam grooves 136 and 138 can be determined using method 200 as follows. First, the desired chord angle CA is selected as a function of deployment angle in step 202. The chord angle CA to deployment angle relationship can be defined using a polynomial equation in some embodiments. In other embodiments, this relationship can be defined using discrete control points along the deployment path. For example, Table 1 illustrates a set of control points defining the deployment path of port wing 38L in which, for each deployment angle, a given chord angle CA has been selected. In the example shown by Table 1, the chord angle CA remains constant or decreases at a lesser rate through initial and final portions of the deployment path relative to an intermediate portion of the deployment path. During the initial portion of the deployment path, maintaining chord angle CA within a relatively narrower range permits slots 42 through projectile body 24 to be narrower than a planar contact pivot. Moreover, maintaining chord angle CA within a relatively narrow range at the final portion of the deployment path allows for variation in the assembly or manufacturing of pivot 58C without unduly affecting the aerodynamic performance of projectile 10.

TABLE 1

Control Points for Example Deployment Path

| Angle of Wing Deployment | Chord Angle CA |
| --- | --- |
| 0 | 20 |
| 10 | 18 |
| 30 | 10 |
| 45 | 6 |
| 60 | 3 |
| 75 | 1 |
| 90 | 0 |

In step 204, an orientation of pivot axis P can be determined based on the desired stowed and deployed positions of port wing 38. In a manner similar to the planar contact pivot embodiments (e.g., pivots 58 and 58A), the orientation of pivot axis P is defined by lateral projection angle PWA of pivot axis P and by longitudinal projection angle PLA of pivot axis P. When lateral projection angle PWA equals longitudinal projection angle PLA, the magnitude of each of angles PWA and PLA equals half the selected chord angle CA in the stowed position. Arrangements with equal projection angles PWA and PLA also deploy to a neutral wing position (i.e., zero chord angle CA) at a 90-degree deployment angle sweep. Moreover, it can be seen that different combinations of lateral projection angle PWA, longitudinal projection angle PLA, and total deployment angle sweep will result in different chord angles CA in the stowed and deployed positions, which can be tailored to a particular application.

Figure 7B:
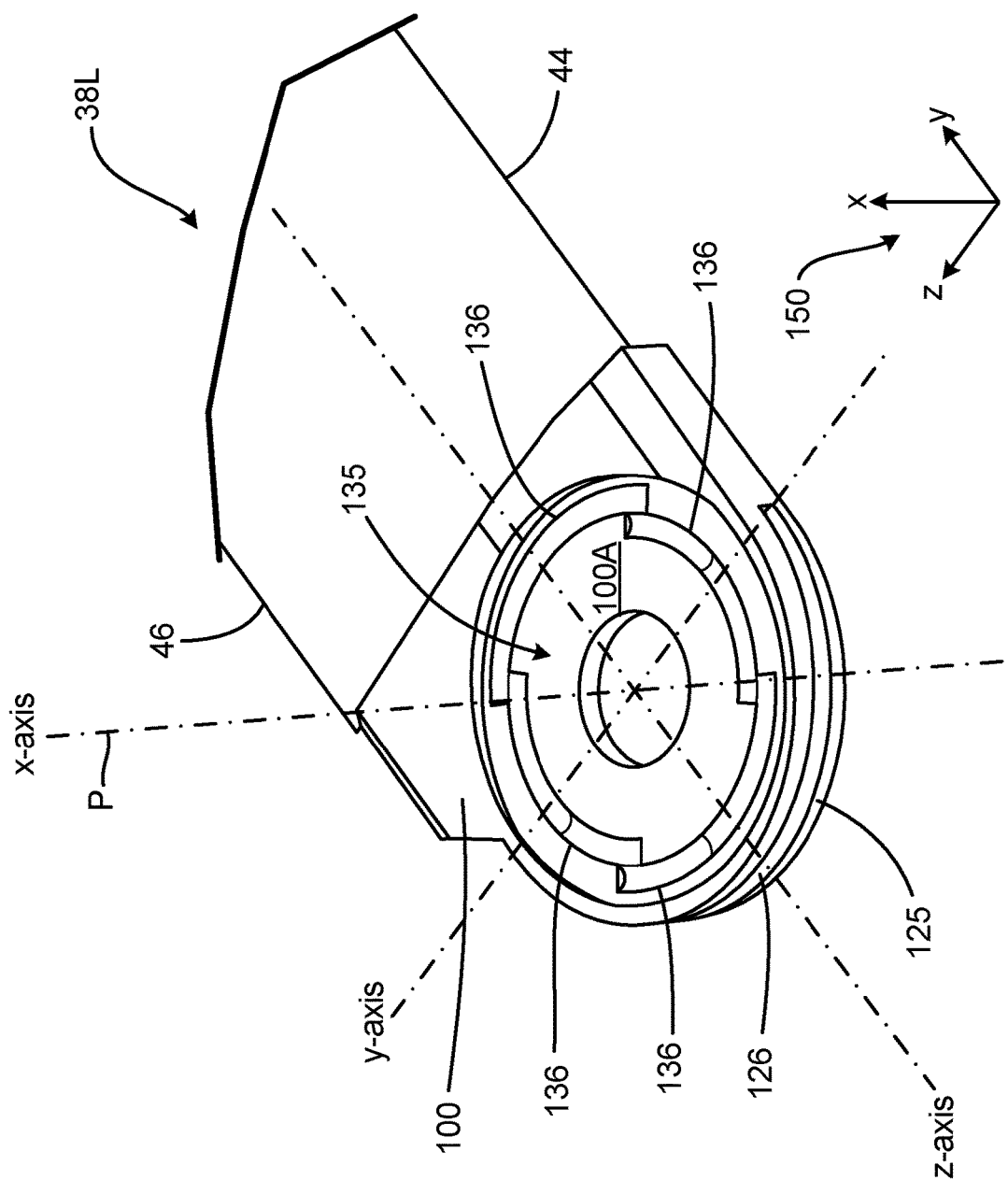
FIG. 7B is an isometric view of port wing showing features of the cam-guided pivot of FIG. 7A.
Figure 8:
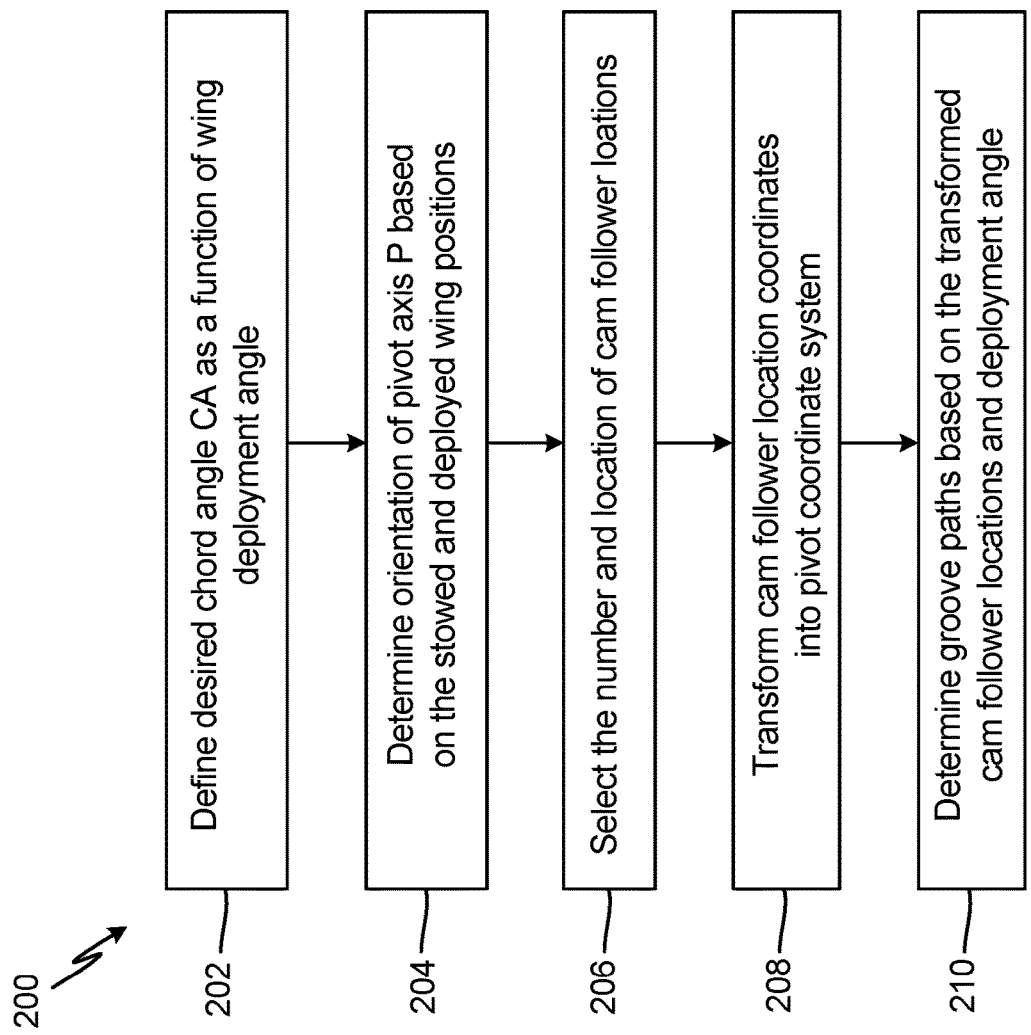
FIG. 8 is a flow chart describing a method of forming cam grooves for the cam-guided pivot of FIGS. 7A and 7B.

At step 206, a set of cam follower locations are selected. The set of cam followers includes at least two pins 140 and two pins 142, if spherical bearing 115 is used to define a third restraint location. If the orientation of wing 38L is to be restrained without relying on spherical bearing, the set of cam follower positions includes at least three pins 140 and at least three pins 142. In the example shown by FIGS. 7A and 7B, four pins 140 and four pins 142 are selected, but more pins 140 and 142 could be used. It is beneficial to select equal numbers of pins 140 and pins 142 so that each of pins 140 can engage one of cam grooves 136 opposite one of pins 142 to minimize bending within lug 100 associated with offsetting pins 142 between adjacent pins 140. Furthermore, the location of each cam follower corresponds to a free end of the cam follower. In the embodiment depicted by FIGS. 7A and 7B, the location of each cam follower is fixed relative to mount 56 and defined using X, Y, Z coordinates in a coordinate system fixed with respect to mount 56. The origin of the mount coordinate system has an origin on pivot axis P, a Y-Z plane coincident with and aligned with one of lug surfaces 100A and 100B, and an X-axis extending away from the lug surface along pivot axis P. For instance, coordinate system 150 is associated with lug surface 100A having XYZ axes aligned with coordinate system 135 when wing 38L is in the stowed position. Since port wing 38L is depicted in the deployed position, coordinate system 150, as depicted in FIG. 7B, has an origin that is offset from the origin of coordinate system 135 for explanatory purposes only. As port wing 38L deploys, coordinate system 150 remains fixed relative to mount 56 while coordinate system 135 remains fixed relative to port wing 38L resulting in the relative orientations of coordinate systems 135 and 150 depicted in FIG. 7B.

In step 208, the XYZ coordinates representing the cam follower locations are transformed from mount coordinate system 150 to pivot coordinate system 135 according to the following equations.

$$X''=X\cos\phi - Y\sin\phi$$

$$Y''=X\sin\phi\cos\theta + Y\cos\phi - Z\sin\theta$$

$$Z''=X\sin\phi\sin\theta + Y\cos\phi\sin\theta + Z\cos\theta$$

where:
X, Y, and Z are the X, Y, and Z coordinates in mount coordinate system 150
X'', Y'', and Z'' are the X, Y, and Z coordinates in pivot coordinate system 135
θ is the wing deployment angle (i.e., rotation about the X-axis), and
φ is the chord angle CA (i.e., rotation about As a result, the transformed cam follower locations are defined as a function of the desired chord angle CA and deployment angle established in step 202 and define a groove path for each cam follower. Subsequently, grooves 136 and 138 are defined in lug surfaces 100A and 100B according to respective groove paths (e.g., grooves 136 shown in FIG. 7B) in step 210.

While planar contact pivots 58 and 58A permit wings 38 to be stowed with a nonzero chord angle CA, pivots 58B and 58C additionally allow the deployment path of wings 38 to be tailored to minimize a size of slots 14. Additionally, a deployment path defined by pivots 58B and 58C can be tailored to control the path of the wing tip during deployment. In some embodiments, it may be undesirable for the wing tip to exceed a threshold vertical displacement with respect to the lug as the wing moves from the stowed position to the deployed position. For example, some projectiles may include multiple sets of wings 38, one set above the horizontal meridional plane and one set below the horizontal meridional plane. In these circumstances, the upper set of wings may interfere with the lower set of wings during deployment if the wing tip paths of each set intersect. To alleviate wing tip interference, the wing tip path can be established by selected desired chord angle CA values as a function of deployment angle that satisfy the wing tip path limit for a given length of wing.

Figure 9:
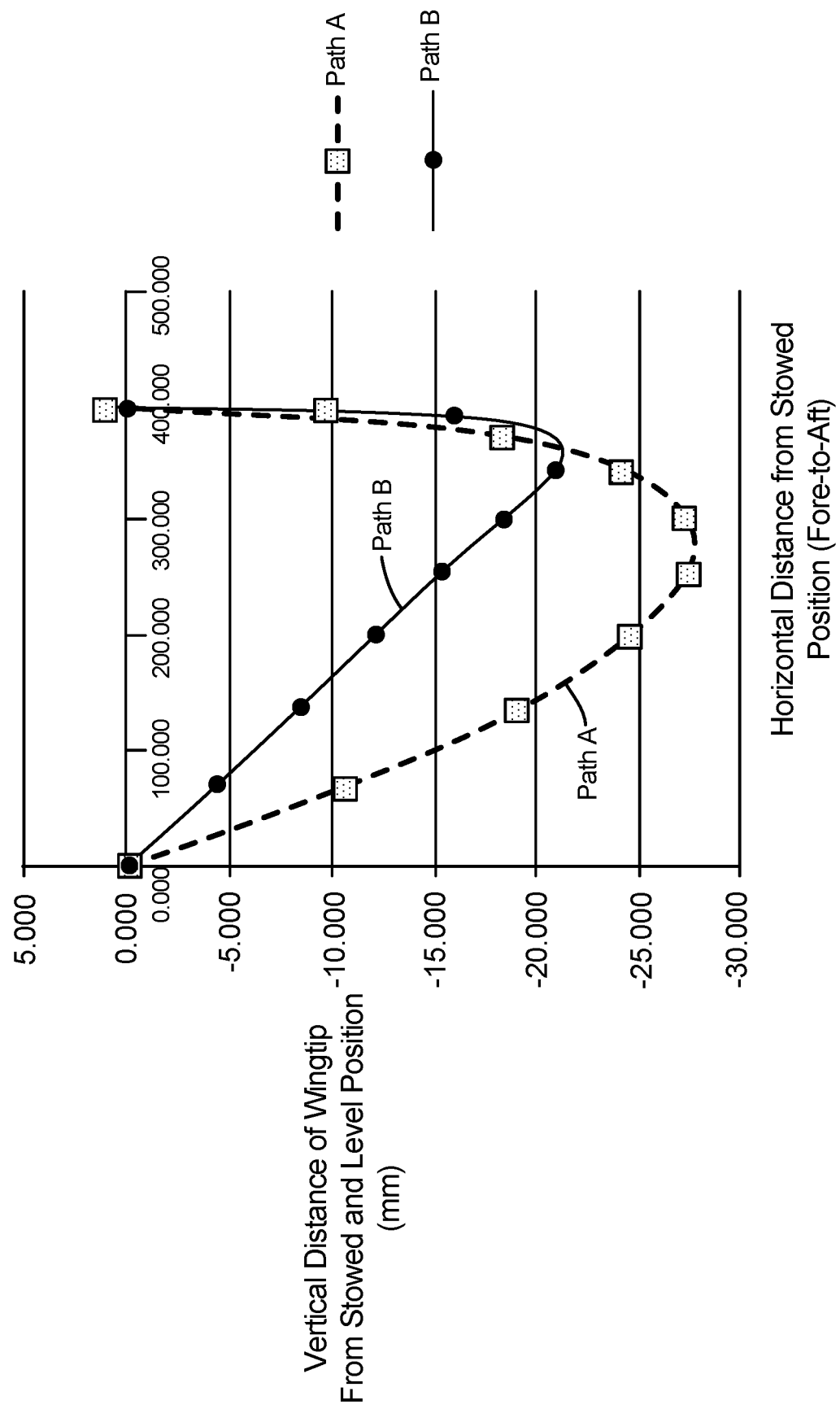
FIG. 9 is a graph showing the vertical displacement of the port wing tip as a function of deployment angle for an exemplary embodiment of a planar contact pivot (Path A) and an exemplary embodiment of a cam-guided pivot (Path B).

FIG. 9 is a graph illustrating the wing tip paths A and B for wing 38L equipped with a planar contact pivot (e.g., pivot 58 or pivot 58A) and a cam-guided pivot (e.g., pivot 58B or 58C), respectively, the cam-guided pivot having a cam groove path tailored to reduce the maximum vertical displacement magnitude of the wing tip during deployment. For example, groove path 126 associated with pivot 58B or grooves 136 and 138 associated with pivot 58C can be configured to reduce maximum vertical displacement magnitude of wing tip 60 as described by FIG. 9. The ordinate axis of FIG. 9 indicates horizontal displacement of the wing tip relative to the stowed position that increases in the aftward direction along longitudinal axis 12 of projectile 10 towards tail section 18. The abscissa axis of FIG. 9 indicates vertical displacement of wing tip 60 relative to a horizontal wing orientation or level orientation in the stowed position. In embodiments having a high-mounted wing configuration, negative vertical wing tip displacement indicates wing tip displacement towards longitudinal axis 12 of projectile 10.

Path A illustrates an exemplary wing tip path for a wing having a planar contact pivot. In this example, the stowed chord angle CA is 20 degrees and the deployed chord angle is 0 degrees, as provided by Table 1 above. Pivot axis P associated with the above stowed and deployed chord angles has longitudinal projection angle PLA equal to 10 degrees and lateral projection angle PWA equal to 10 degrees. For a given wing length equal to 400 millimeters, the wing tip sweeps through a path that exceeds 40 millimeters below the stowed position as shown by Path A.

Path B illustrates another exemplary wing tip path having the same stowed and deployed positions as the wing of Path A except, instead of using a planar contact pivot, this wing utilizes cam-guided pivot 58C that has a wing tip path associated with desired chord angles defined according to Table 1 above. Using this arrangement, the wing tip path does not exceed 35 millimeters below the stowed position as the wing moves from the stowed position to the deployed position.

Discussion of Possible Embodiments

The following are non-exclusive descriptions of possible embodiments of the present invention.

A projectile according to an exemplary embodiment of this disclosure, among other possible things includes a body and a deployable wing coupled to the body and enclosed by the body in a stowed position. A linear distance from a leading edge to a trailing edge of the wing defines a chord line. In the stowed position, the chord line forms an angle with a plane containing the chord line and extending parallel to a parallel direction of the deployable wing in the deployed position.

The projectile of the preceding paragraph can optionally include, additionally and/or alternatively, any one or more of the following features, configurations and/or additional components:

A further embodiment of the foregoing projectile, wherein the deployable wing can be coupled to the body at a pivot.

A further embodiment of any of the foregoing projectiles that include a pivot, wherein rotation of the deployable wing about the pivot can move the deployable wing from the stowed position to the deployed position.

A further embodiment of any of the foregoing projectiles that includes a pivot, wherein a longitudinal plane can extend along a longitudinal axis of the body, and wherein a lateral plane can extend transversely to the body perpendicularly to the longitudinal plane, and wherein the pivot can define a rotational axis having a first projection in the lateral plane forming a first angle with respect to the longitudinal plane and a second projection in the longitudinal plane forming a second angle with respect to the lateral plane.

A further embodiment of any of the foregoing projectiles that includes a pivot, wherein the wing can extend from a proximal end to a distal end, and wherein the proximal end is coupled to the body at the pivot.

A further embodiment of any of the foregoing projectiles, wherein the body can include 1) a nose, 2) a tail opposite the nose along the longitudinal axis of the body, and 3) a plurality of stabilizers extending from the tail.

A further embodiment of any of the foregoing projectiles having a proximal end of the deployable wing coupled to the body at a pivot, wherein the distal end of the deployable wing in the stowed position can be between the proximal end and a nose of the body A further embodiment of any of the foregoing projectiles having a proximal end of the deployable wing coupled to the body at a pivot, wherein the distal end of the deployable wing in the stowed position can be between the proximal end and a tail of the body.

A further embodiment of any of the foregoing projectiles having a pivot defining a rotational axis, wherein the rotational axis can be angled laterally outward from the body and longitudinally forward towards a nose of the body.

A further embodiment of any of the foregoing projectiles having a pivot defining a rotational axis, wherein the rotational axis can be angled laterally outward from the body and longitudinally aft towards a tail of the body.

A further embodiment of any of the foregoing projectiles can further include a lug at a proximal end of the airfoil that defines a first planar surface normal to a rotational axis of a pivot coupling the wing to the body.

A further embodiment of any of the foregoing projectiles can further include a mount extending from an interior surface of the body that defines a second planar surface normal to a rotational axis of a pivot coupling the wing to the body.

A further embodiment of any of the foregoing projectiles that include a lug defining a first planar surface and a mount defining a second planar surface, wherein the pivot includes a shaft extending through aligned bores in the lug and the mount.

A further embodiment of any of the foregoing projectiles can further include a bushing.

A further embodiment of any of the foregoing projectiles that include a bushing, wherein the bushing can include a collar extending through a bore of the lug and along a shaft.

A further embodiment of any of the foregoing projectiles that include a bushing, wherein the bushing can include a flange extending perpendicularly from a collar of the bushing.

A further embodiment of any of the foregoing projectiles that includes a bushing with a flange, wherein the lug can be disposed between the flange and the mount, and wherein a gap defined between the flange and the mount is greater than a thickness of the lug between the flange and the mount.

A further embodiment of any of the foregoing projectiles that includes a bushing, wherein the shaft is a shank of a threaded fastener securing the busing to the mount and retaining the lug of the airfoil between the bushing and the mount.

A further embodiment of any of the foregoing projectiles, wherein the chord angle can be at least 5 degrees.

A further embodiment of any of the foregoing projectiles, wherein the chord angle can be at least 10 degrees.

A further embodiment of any of the foregoing projectiles, wherein the body can define a slot through which the airfoil extends in the deployed position.

A further embodiment of any of the foregoing projectiles that includes a body defining a slot, wherein the slot can be tapered along a longitudinal direction of the body and in a direction moving away from a pivot coupling the wing to the body.

A projectile according to another exemplary embodiment of this disclosure, among other possible things includes a body and a deployable wing coupled to the body. In a stowed position of the wing, the body encloses the wing. In a deployed position, the wing extends outward from the body.

The projectile of the preceding paragraph can optionally include, additionally and/or alternatively, any one or more of the following features, configurations and/or additional components:

A further embodiment of the foregoing projectile, wherein the wing can be coupled to the body at a pivot defining an axis of rotation.

A further embodiment of any of the foregoing projectiles that include a pivot, wherein the axis of rotation can be angled laterally outward from the body and longitudinally forward towards a nose of the body.

A further embodiment of any of the foregoing projectiles that include a pivot, wherein the axis of rotation can be angled laterally outward from the body and longitudinally aft towards a tail of the body.

A further embodiment of any of the foregoing projectiles, wherein the wing can be offset from a meridional plane of the projectile.

A further embodiment of any of the foregoing projectiles that include a pivot, wherein a lateral projection of the axis of rotation forms a first angle and a longitudinal projection of the axis of rotation forms a second angle that is equal to the first angle.

A further embodiment of any of the foregoing projectiles that include a pivot, wherein a lateral projection of the axis of rotation forms a first angle and a longitudinal projection of the axis of rotation forms a second angle that is less than the first angle.

A further embodiment of any of the foregoing projectiles that include a pivot, wherein the airfoil can include a lug interfacing with the pivot.

A further embodiment of any of the foregoing projectiles that include a pivot and a lug, wherein the lug can form an angle with a chord line of the airfoil.

A further embodiment of any of the foregoing projectiles that include a pivot and a lug, wherein the lug can be parallel to a chord line of the airfoil.

A projectile according to another exemplary embodiment of this disclosure, among other possible things includes a body and a deployable wing coupled to the body. In a stowed position of the wing, the body encloses the wing. In a deployed position, the wing extends outward from the body. The wing couples to the body at a pivot defining an axis of rotation. Rotation of the wing about the axis of rotation translates the wing from the stowed position to the deployed position. A lateral projection of the axis of rotation forms a first angle that is equal to a second angle formed by a longitudinal projection of the axis of rotation. The sum of the first and second angles equals a chord angle formed by a chord line of the wing with a meridional plane of the projectile in the stowed position.

A projectile according to another exemplary embodiment of this disclosure, among other possible things includes a body and a deployable wing coupled to the body. In a stowed position of the wing, the body encloses the wing. In a deployed position, the wing extends outward from the body. The wing couples to the body at a pivot defining an axis of rotation. Rotation of the wing about the axis of rotation translates the wing from the stowed position to the deployed position. A lateral projection of the axis of rotation forms a first angle that is greater than a second angle formed by a longitudinal projection of the axis of rotation. The sum of the first and second angles equals a chord angle formed by a chord line of the wing with a meridional plane of the projectile in the stowed position. The wing includes a lug interfacing with the pivot that forms a lug angle with the chord line.

A projectile according to another exemplary embodiment of this disclosure, among other possible things includes a body and a deployable wing coupled to the body. In a stowed position of the wing, the body encloses the wing. In a deployed position, the wing extends outward from the body. The wing couples to the body at a pivot defining an axis of rotation. Rotation of the wing about the axis of rotation translates the wing from the stowed position to the deployed position. A lateral projection of the axis of rotation forms a first angle that is less than a second angle formed by a longitudinal projection of the axis of rotation. The sum of the first and second angles equals a chord angle formed by a chord line of the wing with a meridional plane of the projectile in the stowed position. The wing includes a lug interfacing with the pivot that forms a lug angle with the chord line.

A projectile according to another exemplary embodiment of this disclosure includes, among other possible things, a nose, a body, and a tail boom opposite the nose along a longitudinal axis of the body. The projectile further includes a plurality of stabilizers extending from a mount on the tail boom and a deployable wing coupled to the body at a pivot. Rotation of the deployable wing about the pivot moves the deployable wing from a stowed position to a deployed position. In the stowed or deployed positions, the linear distance from a leading edge to a trailing edge of the deployable wing defines a chord line. In the deployed position, the chord line and a longitudinal dimension of the deployable wing define a reference plane. In the stowed position, the deployable wing is enclosed within the body, and the chord line forms an acute angle with the reference plane.

The projectile of the preceding paragraph can optionally include, additionally and/or alternatively, any one or more of the following features, configurations and/or additional components:

A further embodiment of the foregoing projectile, wherein a longitudinal plane can extend along the longitudinal axis of the body and a lateral plane can extend transversely to the body and perpendicularly to the longitudinal plane.

A further embodiment of any of the foregoing projectiles, wherein the pivot can define a rotational axis having a first projection in the lateral plane forming a first acute angle with respect to the longitudinal plane.

A further embodiment of any of the foregoing projectiles, wherein the pivot can define a rotational axis having a second projection in the longitudinal plane forming a second acute angle with respect to the lateral plane.

A further embodiment of any of the foregoing projectiles, wherein the deployable wing can extend from a proximal end to a distal end in which the proximal end is coupled to the body at the pivot.

A further embodiment of any of the foregoing projectiles, wherein the distal end of the deployable wing in the stowed position can be between the proximal end of the deployable wing and the nose of the body.

A further embodiment of any of the foregoing projectiles, wherein the distal end of the deployable wing in the stowed position can be between the proximal end of the deployable wing and the tail boom.

A further embodiment of any of the foregoing projectiles, wherein the rotational axis can be angled laterally outward from the body and longitudinally forward towards the nose.

A further embodiment of any of the foregoing projectiles, wherein the rotational axis can be angled laterally outward from the body and longitudinally aft towards the tail boom.

A further embodiment of any of the foregoing projectiles, wherein the projectile can include a lug at the proximal end of the deployable wing that defines a first planar surface normal to the rotational axis.

A further embodiment of any of the foregoing projectiles, wherein the projectile can include a mount extending from an interior surface of the body that defines a second planar surface normal to the rotational axis and opposing the first planar surface.

A further embodiment of any of the foregoing projectiles, wherein the pivot can include a shaft extending through aligned bores in the lug and the mount.

A further embodiment of any of the foregoing projectiles, wherein the pivot can include a bushing.

A further embodiment of any of the foregoing projectiles, wherein the bushing can include a collar extending within the bore of the lug and along the shaft.

A further embodiment of any of the foregoing projectiles, wherein the bushing can include a flange extending perpendicularly from the collar such that the lug is disposed between the flange and the mount.

A further embodiment of any of the foregoing projectiles, wherein a gap defined between the flange and the mount can be greater than a thickness of the lug between the flange and the mount.

A further embodiment of any of the foregoing projectiles, wherein the shaft can be a shank of a threaded fastener securing the bushing to the mount and retaining the lug of the deployable wing between the bushing and the mount.

A further embodiment of any of the foregoing projectiles, wherein the body can define a slot through which the deployable wing extends in the deployed position.

A further embodiment of any of the foregoing projectiles, wherein the slot can be tapered along the longitudinal axis of the body and in a direction moving away from the pivot.

A further embodiment of any of the foregoing projectiles, where the projectile can further include a deployable flow guide coupled to the body at a flow guide pivot.

A further embodiment of any of the foregoing projectiles, wherein the deployable flow guide can be disposed between the deployable wing and the nose.

A projectile according to another exemplary embodiment of this disclosure includes, among other possible things, a nose, a body, and a tail boom opposite the nose along a longitudinal axis of the body. The projectile further includes a plurality of stabilizers extending from a mount on the tail boom, a deployable wing coupled to the body at a pivot, and a mount extending from an interior surface of the body. The deployable wing extends longitudinally from a proximal end to a distal end and extends laterally from a leading edge to a trailing edge. The deployable wing includes a lug at the proximal end of the deployable wing, a lug bore extending through the lug, and a chord line defined by a linear distance from the leading edge to the trailing edge. The deployable wing is configured to rotate about a rotational axis of the pivot from a stowed position to a deployed position. The pivot includes a washer plate disposed between the lug and the mount, a collar extending through the lug bore, a flange extending perpendicularly from the collar, and a rabbet adapted to receive the washer plate. A longitudinal plane extends along a longitudinal axis of the body. A lateral plane extends transversely to the body and perpendicularly to the longitudinal plane. The rotational axis of the pivot forms a first projection in the lateral plane forming a first acute angle with respect to the longitudinal plane and a second projection in the longitudinal plane forming a second acute angle with respect to the lateral plane. In the stowed position, the chord line forms an acute angle with the lateral plane of the projectile.

The projectile of the preceding paragraph can optionally include, additionally and/or alternatively, any one or more of the following features, configurations and/or additional components:

A further embodiment of the foregoing projectile, wherein the projectile can further include a plurality of followers affixed to the body of the projectile.

A further embodiment of any of the foregoing projectiles, wherein the lug is disposed between the flange of the bushing and the washer plate.

A further embodiment of any of the foregoing projectiles, wherein the projectile can further include a spherical bearing formed by the lug bore engaging an exterior surface of the collar.

A further embodiment of any of the foregoing projectiles, wherein a linear distance measured perpendicularly between opposing surfaces of the washer plate and the flange can be greater than a thickness of the lug.

A further embodiment of any of the foregoing projectiles, wherein each of the plurality of followers can be received in a groove formed within a peripheral surface of the lug radially outward from the lug bore.

A further embodiment of any of the foregoing projectiles, wherein the projectile can further include a first follower engaging the groove at a location that is aligned with the longitudinal axis of the deployable wing in the stowed position.

A further embodiment of any of the foregoing projectiles, wherein the projectile can further include a second follower that is angularly spaced from the first follower about the axis of rotation.

A further embodiment of any of the foregoing projectiles, wherein the first follower can be noncollinear with the second follower.

A further embodiment of any of the foregoing projectiles, wherein the groove can include a first portion bounded by positions of the first follower in the stowed and deployed positions.

A further embodiment of any of the foregoing projectiles, wherein the entirety of the first portion of the groove can extend parallel to a surface of the lug.

A further embodiment of any of the foregoing projectiles, wherein the groove can includes a second portion bounded by positions of the second follower in the stowed and deployed positions.

A further embodiment of any of the foregoing projectiles, wherein the second portion can have at least a segment that extends obliquely to the surface of the lug.

A further embodiment of any of the foregoing projectiles, wherein the projectile can further include a first plurality of followers affixed to the washer plate.

A further embodiment of any of the foregoing projectiles, wherein the projectile can further include a second plurality of followers affixed to the flange.

A further embodiment of any of the foregoing projectiles, wherein each of the first plurality of followers can be received in one or more first grooves formed within a first planar surface of the lug.

A further embodiment of any of the foregoing projectiles, wherein each of the second plurality of followers can be received in one or more second grooves formed within a second planar surface of the lug opposite the first planar surface.

A further embodiment of any of the foregoing projectiles, wherein a first depth of the one or more first grooves can vary along an arc length of the one or more first grooves.

A further embodiment of any of the foregoing projectiles, wherein a second depth of the one or more second grooves can vary along an arc length of the one or more second grooves.

A further embodiment of any of the foregoing projectiles, wherein the one or more first grooves can include at least two first grooves defined along different radii with respect to the lug bore.

A further embodiment of any of the foregoing projectiles, wherein the one or more second grooves can include at least two second grooves defined along different radii with respect to the lug bore.

A further embodiment of any of the foregoing projectiles, wherein the first plurality of followers can include at least three first followers.

A further embodiment of any of the foregoing projectiles, wherein the second plurality of followers can include at least three second followers.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A projectile comprising:
   a nose;
   a body;
   a tail boom opposite the nose along a longitudinal axis of the body;
   a plurality of stabilizers extending from a mount on the tail boom; and
   a deployable wing coupled to the body at a pivot, wherein:
      rotation about the pivot moves the deployable wing from a stowed position to a deployed position;
      a linear distance from a leading edge to a trailing edge of the deployable wing defines a chord line;
      a reference plane is defined, in the deployed position, by the chord line and a longitudinal dimension of the deployable wing;
      the deployable wing is enclosed by the body in the stowed position; and
      the chord line forms an acute angle with the reference plane in the stowed position;
   wherein a longitudinal plane extends along the longitudinal axis of the body, and wherein a lateral plane extends transversely to the body and perpendicularly to the longitudinal plane, and wherein the pivot defines a rotational axis having a first projection in the lateral plane forming an first acute angle with respect to the longitudinal plane and a second projection in the longitudinal plane forming a second acute angle with respect to the lateral plane.

2. The projectile of claim 1, wherein the deployable wing extends from a proximal end to a distal end in which the proximal end is coupled to the body at the pivot.

3. The projectile of claim 2, wherein the distal end of the deployable wing in the stowed position is between the proximal end of the deployable wing and the nose of the body.

4. The projectile of claim 2, wherein the distal end of the deployable wing in the stowed position is between the proximal end of the deployable wing and the tail boom.

5. The projectile of claim 1, wherein the rotational axis is angled laterally outward from the body and longitudinally forward towards the nose.

6. The projectile of claim 1, wherein the rotational axis is angled laterally outward from the body and longitudinally aft towards the tail boom.

7. The projectile of claim 1, and further comprising:
a lug at the proximal end of the deployable wing that defines a first planar surface normal to the rotational axis; and
a mount extending from an interior surface of the body that defines a second planar surface normal to the rotational axis and opposing the first planar surface;
wherein the pivot includes a shaft extending through aligned bores in the lug and the mount.

8. The projectile of claim 7, and further comprising:
a bushing comprising:
   a collar extending within the bore of the lug and along the shaft; and
   a flange extending perpendicularly from the collar such that the lug is disposed between the flange and the mount, wherein a gap defined between the flange and the mount is greater than a thickness of the lug between the flange and the mount.

9. The projectile of claim 8, wherein the shaft is a shank of a threaded fastener securing the bushing to the mount and retaining the lug of the deployable wing between the bushing and the mount.

10. The projectile of claim 1, wherein the body defines a slot through which the deployable wing extends in the deployed position, and wherein the slot is tapered along the longitudinal axis of the body and in a direction moving away from the pivot.

11. The projectile of claim 1, and further comprising:
a deployable flow guide coupled to the body at a flow guide pivot, wherein the deployable flow guide is disposed between the deployable wing and the nose.

12. A projectile comprising:
a nose;
a body, wherein a longitudinal plane extends along a longitudinal axis of the body, and wherein a lateral plane extends transversely to the body and perpendicularly to the longitudinal plane;
a tail boom opposite the nose along the longitudinal axis of the body;
a plurality of stabilizers extending from a mount on the tail boom;
a deployable wing extending longitudinally from a proximal end to a distal end and extending laterally from a leading edge to a trailing edge, the deployable wing comprising:
   a lug at the proximal end of the deployable wing;
   a lug bore extending through the lug; and
   a chord line defined by a linear distance from the leading edge to the trailing edge;
a mount extending from an interior surface of the body; and
a pivot coupling the deployable wing to the body, the deployable wing configured to rotate about a rotational axis from a stowed position to a deployed position, the pivot comprising:
   a washer plate disposed between the lug and the mount;
   a bushing comprising:
      a collar extending through the lug bore;
      a flange extending perpendicularly from the collar such that the lug is disposed between the flange and the washer plate; and
      a rabbet adapted to receive the washer plate;
   wherein the rotational axis forms a first projection in the lateral plane forming a first acute angle with respect to the longitudinal plane and a second projection in the longitudinal plane forming a second acute angle with respect to the lateral plane; and
   wherein the chord line forms an acute angle with the lateral plane of the projectile in the stowed position.

13. The projectile of claim 12, and further comprising:
a plurality of followers affixed to the body of the projectile; and
a spherical bearing formed by the lug bore engaging an exterior surface of the collar;
wherein a linear distance measured perpendicularly between opposing surfaces of the washer plate and the flange is greater than a thickness of the lug; and
wherein each of the plurality of followers is received in a groove formed within a peripheral surface of the lug radially outward from the lug bore.

14. The projectile of claim 13, wherein the plurality of followers includes:
a first follower engaging the groove at a location that is aligned with the longitudinal axis of the deployable wing in the stowed position; and
a second follower that is angularly spaced from the first follower about the axis of rotation, wherein the first follower is noncollinear with the second follower.

15. The projectile of claim 14,
wherein the groove includes a first portion bounded by positions of the first follower in the stowed and deployed positions, the entirety of the first portion extending parallel to a surface of the lug; and
wherein the groove includes a second portion bounded by positions of the second follower in the stowed and deployed positions, the second portion having at least a segment that extends obliquely to the surface of the lug.

16. The projectile of claim 12, and further comprising:
a plurality of first followers affixed to the washer plate;
a plurality of second followers affixed to the flange; and
a spherical bearing formed by the lug bore engaging an exterior surface of the collar;
wherein a linear distance measured perpendicularly between opposing surfaces of the washer plate and the flange is greater than a thickness of the lug;
wherein each of the plurality of first followers is received in one or more first grooves formed within a first planar surface of the lug; and
wherein each of the plurality of second followers is received in one or more second grooves formed within a second planar surface of the lug opposite the first planar surface.

17. The projectile of claim 16,
wherein a first depth of the one or more first grooves varies along an arc length of the one or more first grooves; and
wherein a second depth of the one or more second grooves varies along an arc length of the one or more second grooves.

18. The projectile of claim 17,
wherein the one or more first grooves includes at least two first grooves defined along different radii with respect to the lug bore; and
wherein the one or more second grooves includes at least two second grooves defined along different radii with respect to the lug bore.

19. The projectile of claim 16,
wherein the plurality of first followers includes at least three first followers, and
wherein the plurality of second followers includes at least three second followers.

* * * * *